US012793330B2

(12) United States Patent
Park et al.

(10) Patent No.: US 12,793,330 B2
(45) Date of Patent: Nov. 10, 2026

(54) DEVICE AND METHOD WITH SCENE COMPONENT INFORMATION ESTIMATION

(71) Applicant: SAMSUNG ELECTRONICS CO., LTD., Suwon-si (KR)

(72) Inventors: Jinwoo Park, Suwon-si (KR); Nahyup Kang, Suwon-si (KR); Jiyeon Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 147 days.

(21) Appl. No.: 18/327,332

(22) Filed: Jun. 1, 2023

(65) Prior Publication Data

US 2024/0177408 A1 May 30, 2024

(30) Foreign Application Priority Data

Nov. 24, 2022 (KR) ........................ 10-2022-0159547

(51) Int. Cl.
*G06T 15/50* (2011.01)
*G06T 7/73* (2017.01)
(Continued)

(52) U.S. Cl.
CPC .............. *G06T 15/506* (2013.01); *G06T 7/73* (2017.01); *G06T 11/00* (2013.01); *G06T 15/06* (2013.01);
(Continued)

(58) Field of Classification Search
None
See application file for complete search history.

(56) References Cited

U.S. PATENT DOCUMENTS 10,235,797 B1 3/2019 Sheffield et al.
10,810,469 B2 10/2020 Sunkavalli et al.
(Continued)

FOREIGN PATENT DOCUMENTS

KR 10-1926555 B1 12/2018

OTHER PUBLICATIONS

Srinivasan, Pratul P., et al. "Nerv: Neural reflectance and visibility fields for relighting and view synthesis." Proceedings of the IEEE/CVF conference on computer vision and pattern recognition. 2021 (Year: 2021).*

(Continued)

*Primary Examiner* — Nurun Flora
(74) *Attorney, Agent, or Firm* — Sughrue Mion, PLLC

(57) ABSTRACT

An electronic device includes: one or more processors configured to: extract, using an implicit neural representation (INR) model, a global geometry feature and information indicating whether a point is on a surface from a viewpoint and a view direction corresponding to an image pixel corresponding to a two-dimensional (2D) scene at the viewpoint within a field of view (FOV); determine an object surface position corresponding to the viewpoint and the view direction and normal information of the object surface position based on the information indicating whether the point is on the surface; estimate, using an albedo estimation model, albedo information independent of the view direction from the global geometry feature, the object surface position, and the normal information; and estimate, using a specular estimation model, specular information dependent on the view direction from the global geometry feature, the object surface position, the normal information, and the view direction.

18 Claims, 11 Drawing Sheets

(51) Int. Cl.
*G06T 11/00* (2026.01)
*G06T 15/06* (2011.01)

(52) U.S. Cl.
CPC ................................ *G06T 2200/24* (2013.01); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 11,295,514 B2 | 4/2022 | Gu et al. | |
| 2022/0284658 A1* | 9/2022 | Müller .................... | G06N 3/084 |

OTHER PUBLICATIONS

Srinivasan, Pratul P., et al. "NeRV: Neural Reflectance and Visibility Fields for Relighting and View Synthesis." Proceedings of the IEEE/CVF Conference on Computer Vision and Pattern Recognition. 2021., (10 pages).

Insafutdinov, Eldar, et al. "SNeS: Learning Probably Symmetric Neural Surfaces from Incomplete Data." European Conference on Computer Vision. Cham: Springer Nature Switzerland, 2022., (17 pages).

Dave, Akshat, et al. "PANDORA: Polarization-Aided Neural Decomposition of Radiance." European Conference on Computer Vision. Cham: Springer Nature Switzerland, 2022., (19 pages).

Choi, Changwoon, et al. "IBL-NeRF: Image-Based Lighting Formulation of Neural Radiance Fields." Computer Graphics Forum. vol. 42. No. 7. arXiv:2210.08202v2 [cs.CV] Sep. 12, 2023., (20 pages).

Extended European search report issued on Apr. 24, 2024, in counterpart European Patent Application No. 23187908.1 (10 pages).

Zhang, Yuanqing, et al. "Modeling indirect illumination for inverse rendering." *Proceedings of the IEEE/CVF Conference on Computer Vision and Pattern Recognition*. 2022.

Yariv, Lior, et al. "Multiview neural surface reconstruction by disentangling geometry and appearance." *Advances in Neural Information Processing Systems* 33 (2020): pp. 2492-2502.

Mildenhall, Ben, et al. "Nerf: Representing scenes as neural radiance fields for view synthesis." *Communications of the ACM* 65.1 (2021): pp. 99-106.

Zhang, Xiuming, et al. "Nerfactor: Neural factorization of shape and reflectance under an unknown illumination." *ACM Transactions on Graphics* (*TOG*) 40.6 (2021): pp. 1-18.

Boss, Mark, et al. "Neural-pil: Neural pre-integrated lighting for reflectance decomposition." *Advances in Neural Information Processing Systems* 34 (2021): pp. 10691-10704.

Karis, Brian, and Epic Games. "Real shading in unreal engine 4." *Proc. Physically Based Shading Theory Practice* 4.3 (2013): 1.

* cited by examiner

DEVICE AND METHOD WITH SCENE COMPONENT INFORMATION ESTIMATION

CROSS-REFERENCE TO RELATED APPLICATIONS

This application claims the benefit under 35 USC § 119(a) of Korean Patent Application No. 10-2022-0159547, filed on Nov. 24, 2022 in the Korean Intellectual Property Office, the entire disclosure of which is incorporated herein by reference for all purposes.

BACKGROUND

1. Field

The following description relates to a device and method with scene component information estimation.

2. Description of Related Art

A goal of computer graphics may include a photorealistic synthesis of an image and a video. Methods and representations may mimic an imaging model of a real camera, including complex materials and global illumination processing. These methods may simulate light propagation from a light source to a virtual camera for synthesis based on the law of physics. For this, all physical parameters of a scene may need to be determined in a rendering process. For example, the parameters may include information about scene geometry and material properties such as reflectivity or opacity. When such information is provided, the latest ray tracing techniques may generate photorealistic images. In addition to the physics-based rendering methods, there are techniques, based on mathematical approximation, close to real imaging models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an electronic device includes: one or more processors configured to: extract, using an implicit neural representation (INR) model, a global geometry feature and information indicating whether a point is on a surface from a viewpoint and a view direction corresponding to an image pixel corresponding to a two-dimensional (2D) scene at the viewpoint within a field of view (FOV); determine an object surface position corresponding to the viewpoint and the view direction and normal information of the object surface position based on the information indicating whether the point is on the surface; estimate, using an albedo estimation model, albedo information independent of the view direction from the global geometry feature, the object surface position, and the normal information; and estimate, using a specular estimation model, specular information dependent on the view direction from the global geometry feature, the object surface position, the normal information, and the view direction.

The one or more processors may be configured to determine a pixel value of the image pixel based on scene component information including any one or any combination of any two or more of visibility information, indirect light information, and direct light information together with the albedo information and the specular information.

The one or more processors may be configured to estimate, using a machine learning model, the scene component information from the global geometry feature, the object surface position, and the normal information, for ray directions departing from the object surface position.

For the determining of the pixel value, the one or more processors may be configured to individually estimate visibility information using a visibility estimation model, indirect light information using an indirect light estimation model, and direct light information using a direct light estimation model from the global geometry feature, the object surface position and the normal information, for ray directions departing from the object surface position.

The one or more processors may be configured to: estimate scene component information including albedo information and specular information for view directions corresponding to image pixels corresponding to the 2D scene from the viewpoint; and generate a 2D image by determining pixel values of the image pixels using scene component information estimated for the image pixels.

The one or more processors may be configured to: adjust any one or any combination of any two or more of scene component of visibility information, indirect light information, direct light information, the albedo information, and the specular information, based on a user input; and determine a pixel value of a pixel of the 2D image corresponding to the viewpoint and the view direction based on the adjusted scene component and an estimated scene component.

The one or more processors may be configured to obtain the object surface position by repeatedly performing a ray marching based on the information indicating whether the point is on the surface, in the view direction from the viewpoint.

The one or more processors may be configured to: determine a point spaced apart from the viewpoint in the view direction; and generate, using the INR model, a global geometry feature corresponding to the determined point and distance information on a distance between the determined point and an object surface.

The one or more processors may be configured to determine normal information of the determined point by analyzing the viewpoint, the view direction, and information indicating whether the determined point is on a surface.

The INR model may be trained based on an output of a neural renderer, and the neural renderer may be configured to estimate a pixel value of an image pixel from the global geometry feature, the object surface position, the normal information, and the view direction.

The one or more processors may be configured to estimate visibility information using a visibility estimation model trained using visible distances between the object surface position and arrival points determined based on ray marching for ray directions departing from the object surface position.

The one or more processors may be configured to estimate indirect light information using an indirect light estimation model trained using color information of arrival points of rays departing from the object surface position viewed from the object surface position.

The color information of the arrival points for training of the indirect light estimation model may be estimated using the INR model and a neural renderer which are completely trained.

The albedo estimation model and the specular estimation model may be trained based on an objective function value between a ground truth (GT) 2D image and a temporary 2D image reconstructed based on albedo information output from the albedo estimation model, specular information output from the specular estimation model, and other scene component information output from a machine learning model.

The temporary 2D image may be reconstructed using an approximation that is based on a split of a rendering operation that determines an image pixel value based on scene component information into a reflection component and an illumination component.

In one or more general aspects, a processor-implemented method includes: extracting, using an implicit neural representation (INR) model, a global geometry feature and information indicating whether a point is on a surface from a viewpoint and a view direction corresponding to an image pixel corresponding to a two-dimensional (2D) scene at the viewpoint within a field of view (FOV); determining an object surface position corresponding to the viewpoint and the view direction and normal information of the object surface position based on the information indicating whether the point is on the surface; estimating, using an albedo estimation model, albedo information independent of the view direction from the global geometry feature, the object surface position, and the normal information; and estimating, using a specular estimation model, specular information dependent on the view direction from the global geometry feature, the object surface position, the normal information, and the view direction.

The method may include determining a pixel value of the image pixel based on scene component information including any one or any combination of any two or more of visibility information, indirect light information, and direct light information together with the albedo information and the specular information.

The determining of the pixel value may include individually estimating visibility information using a visibility estimation model, indirect light information using an indirect light estimation model, and direct light information using a direct light estimation model, from the global geometry feature, the object surface position and the normal information, for ray directions departing from the object surface position.

The method may include: adjusting any one or any combination of any two or more scene component of visibility information, indirect light information, direct light information, the albedo information, and the specular information, based on a user input; and determining a pixel value of a pixel of the 2D image corresponding to the viewpoint and the view direction based on the adjusted scene component and an estimated scene component.

In one or more general aspects, a non-transitory computer-readable storage medium stores instructions that, when executed by a processor, configure the processor to perform any one, any combination, or all of operations and/or methods described herein.

In one or more general aspects, an electronic device includes: one or more processors configured to: train, using an output of a neural renderer, an implicit neural representation (INR) model to output a global geometry feature of a point, the neural renderer being configured to estimate a pixel value of an image pixel corresponding to a two-dimensional (2D) scene based on the global geometry feature; train, using the global geometry feature output from the trained INR model, an albedo estimation model to output albedo information of the pixel value independent of a view direction corresponding to the image pixel; and train, using the global geometry feature output from the trained INR model, a specular estimation model to output specular information of the pixel value dependent on the view direction.

Other features and aspects will be apparent from the following detailed description, the drawings, and the claims.

Figure 1:
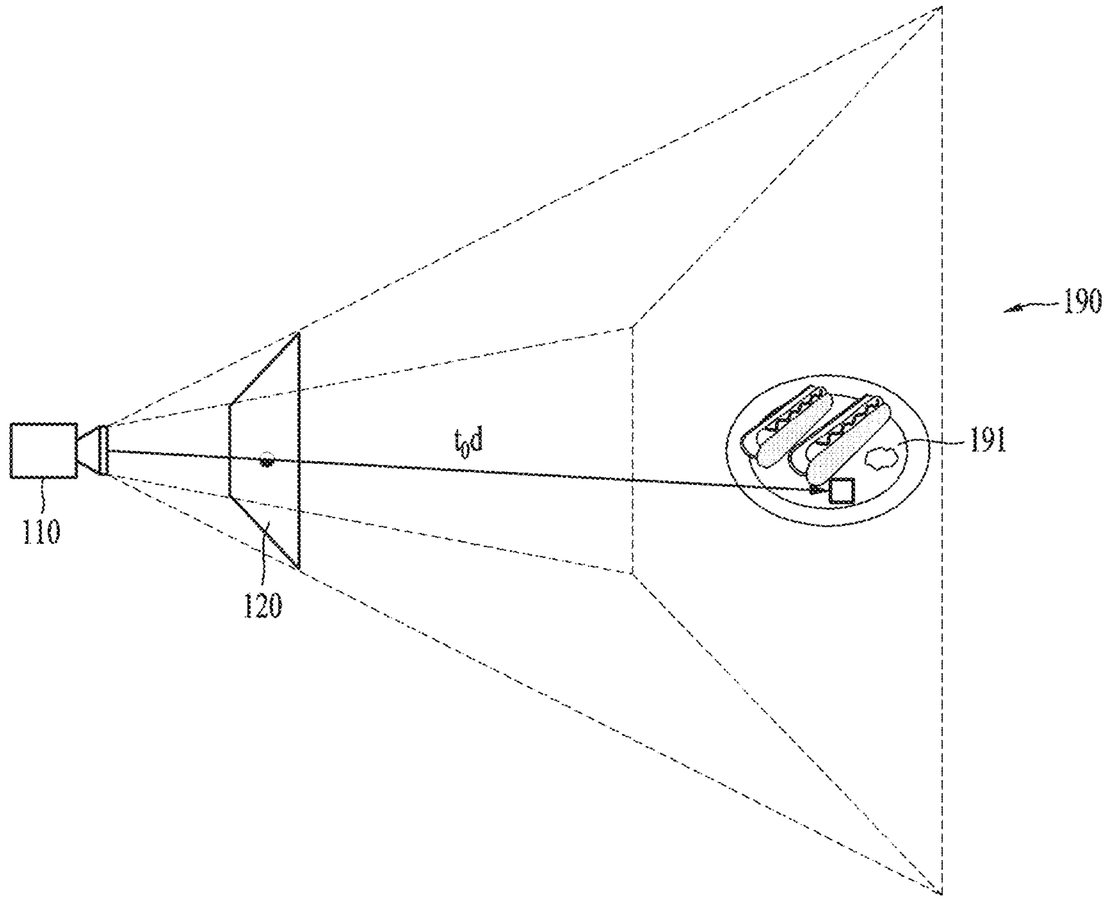
FIG. 1 illustrates an example of a two-dimensional (2D) scene observed at a viewpoint.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms, such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being “on”, “connected to,” “coupled to,” or “joined to” another component, element, or layer it may be directly (e.g., in contact with the other component or element) “on”, “connected to,” “coupled to,” or “joined to” the other component, element, or layer or there may reasonably be one or more other components, elements, layers intervening therebetween. When a component or element is described as being “directly on”, “directly connected to,” “directly coupled to,” or “directly joined” to another component or element, there can be no other elements intervening therebetween. Likewise, expressions, for example, “between” and “immediately between” and “adjacent to” and “immediately adjacent to” may also be construed as described in the foregoing.

The terminology used herein is for describing various examples only and is not to be used to limit the disclosure. The articles “a,” “an,” and “the” are intended to include the plural forms as well, unless the context clearly indicates otherwise. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof.

As used herein, the term “and/or” includes any one and any combination of any two or more of the associated listed items. The phrases “at least one of A, B, and C”, “at least one of A, B, or C”, and the like are intended to have disjunctive meanings, and these phrases “at least one of A, B, and C”, “at least one of A, B, or C”, and the like also include examples where there may be one or more of each of A, B, and/or C (e.g., any combination of one or more of each of A, B, and C), unless the corresponding description and embodiment necessitates such listings (e.g., “at least one of A, B, and C”) to be interpreted to have a conjunctive meaning.

Unless otherwise defined, all terms, including technical and scientific terms, used herein have the same meaning as commonly understood by one of ordinary skill in the art to which the present disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term “may” herein with respect to an example or embodiment, e.g., as to what an example or embodiment may include or implement, means that at least one example or embodiment exists where such a feature is included or implemented, while all examples are not limited thereto.

Hereinafter, the examples will be described in detail with reference to the accompanying drawings. When describing the examples with reference to the accompanying drawings, like reference numerals refer to like components and a repeated description related thereto will be omitted.

FIG. 1 illustrates an example of a two-dimensional (2D) scene observed at a viewpoint.

According to an example, an electronic device (e.g., an electronic device 1000 of FIG. 10) may generate an image corresponding to a 2D scene 120 obtained by observing a three-dimensional (3D) space 190 at a viewpoint 110. The viewpoint 110 may be an arbitrary point at which a scene is observed within the 3D space 190. Referring to FIG. 1, the viewpoint 110 may be interpreted as a point in which a camera or eye viewing a scene in the 3D space 190 within a field of view (FOV) is positioned. The camera is shown at the viewpoint 110 in FIG. 1 may be a real camera sensor or the camera may not be a real camera sensor, but a virtual camera with a view direction and FOV that are arbitrarily set. Accordingly, the camera may be interpreted as an observer of the 2D scene 120. For example, an image corresponding to the 2D scene 120 may be interpreted as an image representing a scene captured by a virtual camera at the viewpoint 110 in the 3D space 190 at an arbitrary FOV. The 3D space 190 may be a virtual space or a real physical space.

The electronic device may generate an image corresponding to the 2D scene 120 when an object 191 in the 3D space 190 is viewed in an arbitrary view direction and FOV. For example, the electronic device may determine an image pixel corresponding to the viewpoint 110 and the view direction. A view direction from the viewpoint 110 may pass through an image pixel included in an image (e.g., an image of the 2D scene 120) corresponding to the 2D scene 120. The view direction passing through the image pixel may reach a point (e.g., a point on the object 191) in the 3D space 190. The electronic device may determine image information (e.g., a color value) on the image representing the point on the object 191 that the view direction reaches at the viewpoint 110 as a pixel value of a corresponding image pixel. As will be described below, the electronic device may determine a pixel value of an image pixel based on physical properties (e.g., scene component information) of a point. In the present specification, c may represent the viewpoint 110 (e.g., a position of a virtual camera), d may represent the view direction, $t_0$ may represent a distance from the viewpoint 110 to a 3D point first encountered in the view direction, and p may represent the 3D point first encountered in the view direction. Information indicating the 3D point p may be referred to as point information and may include 3D coordinates. The 3D point p may also be referred to as an object surface position.

The electronic device of one or more embodiments may sequentially train each model in a network for an estimation of scene components. Accordingly, the electronic device of one or more embodiments may increase stability of training by the sequential training, compared to a typical electronic device which trains using integrated learning. Scene component information may be information indicating physical properties of each point of a scene. The electronic device may distinguish and estimate physical properties. The scene component information may include physical properties that will be described below. The physical properties may include at least one of albedo information, specular information, visibility information, indirect light information, or direct light information. An example of estimating the above five physical properties will be mainly described herein.

Albedo information associated with an arbitrary point may be an albedo value (e.g., a value indicating a degree of diffuse reflection when a corresponding point receives light), and may include, for example, an albedo parameter of a bidirectional reflectance distribution function (BRDF) model (e.g., a Cook-Torrance BRDF model). The specular information may be a specular value (e.g., a value indicating a degree of specular reflection when a corresponding point receives light) of a corresponding point, and may include, for example, a specular parameter of a BRDF model. The visibility information may be information indicating visibility at a corresponding point for each of ray directions, and may include a visibility map including a value indicating a presence or an absence of a point at which rays traveling for each of ray directions departing from the corresponding point arrives. For example, when the point is present, the value may be "0", and when the point is absent, the value may be "1". The indirect light information may be information about indirect light for each of ray directions that have an influence on a corresponding point, and may indicate a color (or radiance) of indirect light corresponding to each of the ray directions from the corresponding point. The direct light information may indicate a color (e.g., a mixed color of light by a plurality of light sources) of a light source that has a direct influence on a corresponding point.

The electronic device of one or more embodiments may estimate albedo information and specular information using separate models (e.g., an albedo estimation model and a specular estimation model) depending on whether the albedo information and specular information depend on a view direction. Therefore, the electronic device of one or more embodiments may accurately distinguish and estimate physical properties of points in the 3D space 190 viewed in the 2D scene 120.

As will be described below, the electronic device of one or more embodiments may use ray marching with a smaller amount of computational operation than that of ray tracing. The electronic device of one or more embodiments may estimate physical properties of a point with a smaller amount of computational operation than that of physics-based rendering. Thus, the electronic device of one or more embodiments may be implemented in a mobile device as well as a graphics device of a personal computer (PC) to perform high-quality scene rendering in real time. The electronic device of one or more embodiments may perform realistic rendering on a mobile device that includes a graphics processing unit (GPU) and a neural processing unit (NPU).

According to an example, an image-based rendering (IBR) scheme of estimating a geometry of a 3D scene based on captured images and performing rendering may be combined with deep learning. For example, the electronic device may estimate scene property information (e.g., physical properties) corresponding to a 2D scene 120 obtained by observing the 3D space 190 from a new camera view (e.g., a view that has not been previously captured), based on a neural structure (e.g., a neural network) trained using images (e.g., color images based on an RGB color space) captured or rendered from various camera views (e.g., various viewpoints 110 and view directions), and may perform image rendering. The electronic device may perform realistic rendering in various dynamic changes of a physical environment (e.g., lighting, etc.).

The electronic device of one or more embodiments may render a high-quality 3D scene under various conditions (e.g., a view, a material, and lighting). The electronic device may render a realistic image representing the 2D scene 120 for visualization of a 3D game application or a 3D scene of a metaverse. When the electronic device is implemented as a mobile device, the electronic device may provide a user with a realistic experience without space constraints.

Hereinafter, an example of a network structure (e.g., a scene component estimation network) for an estimation of scene component information and an example of an inference (e.g., an estimation) of scene component information using the scene component estimation network are described with reference to FIGS. 2A and 2B.

Figure 2A:
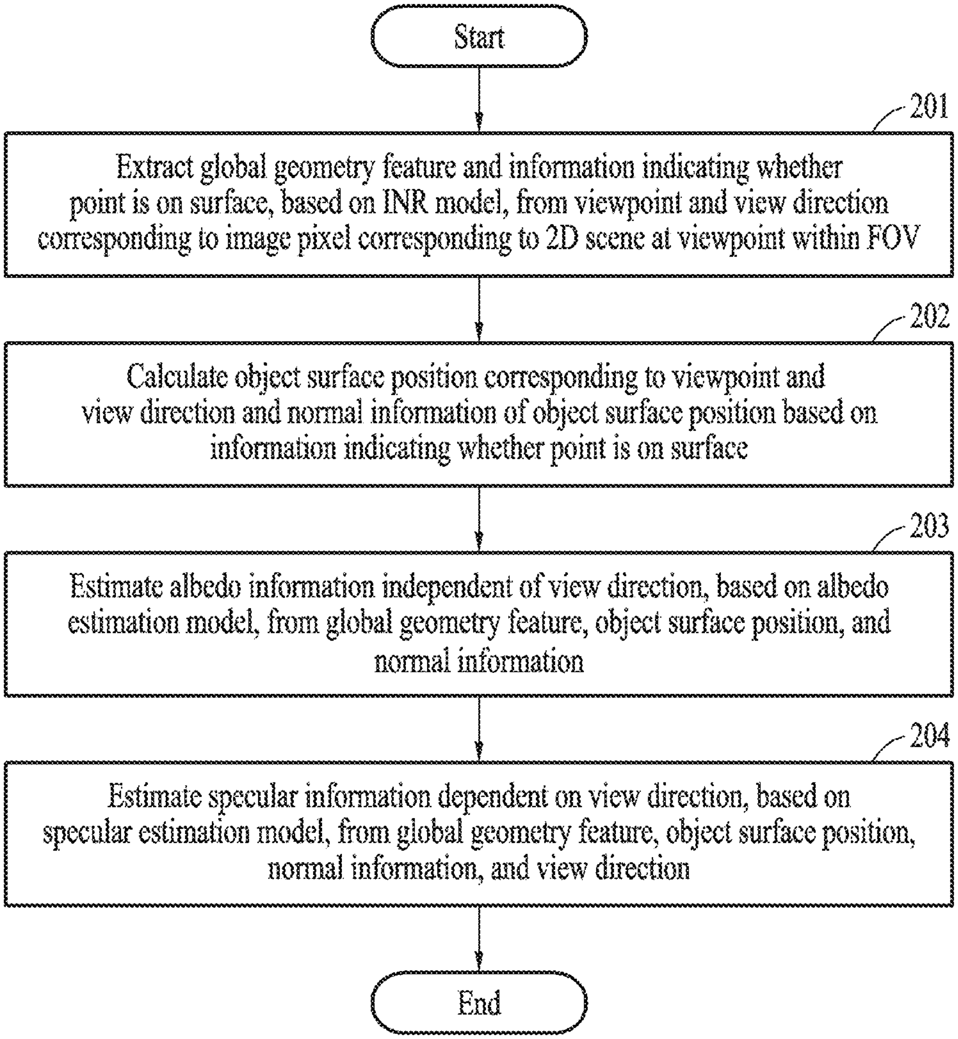
FIG. 2A is a flowchart illustrating an example of a scene component estimation method.
Figure 2B:
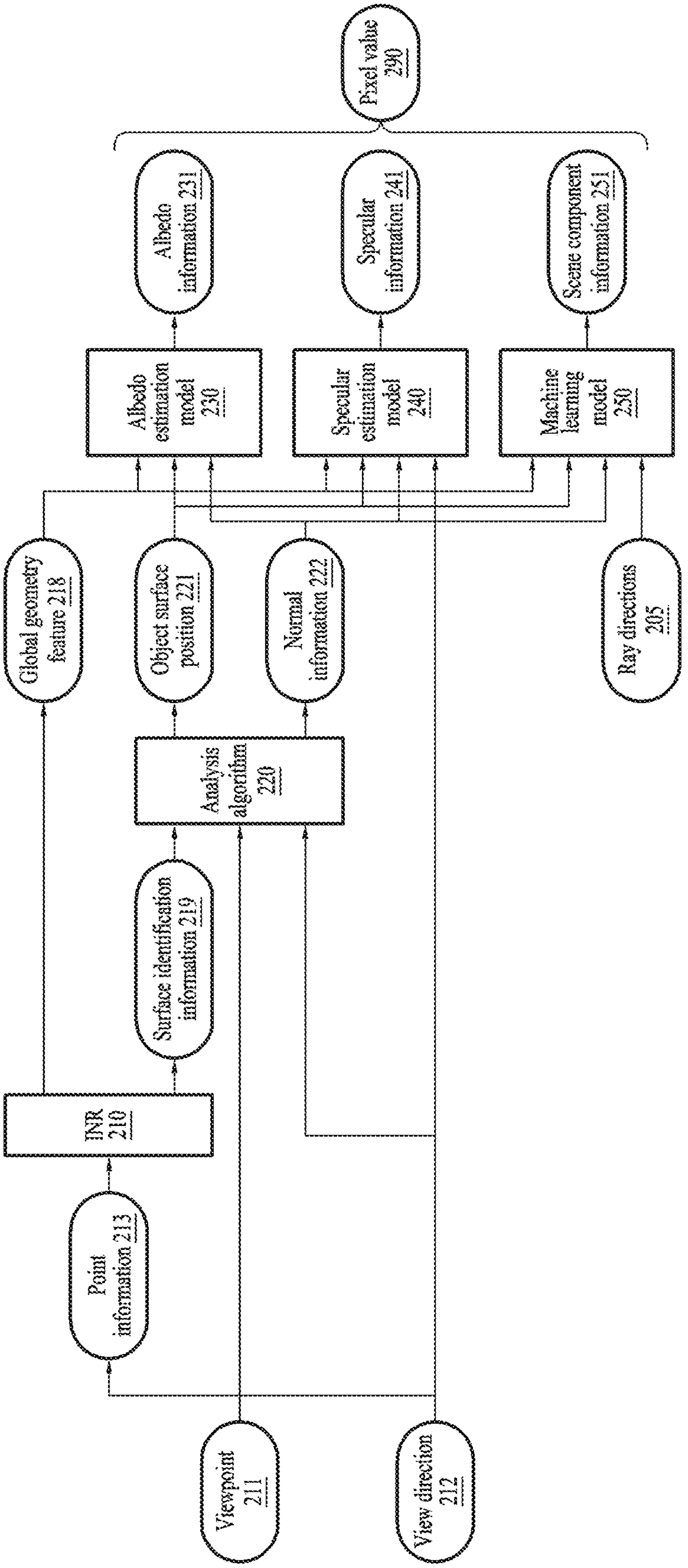
FIG. 2B illustrates an example of a network structure for estimating scene component information distinguished for each view dependency.

FIG. 2A is a flowchart illustrating an example of a scene component estimation method, and FIG. 2B illustrates an example of a network structure (e.g., the scene component estimation network) for estimating scene component information distinguished for each view dependency.

An electronic device (e.g., the electronic device 1000 of FIG. 10) may store an implicit neural representation (INR) model 210, an albedo estimation model 230, and a specular estimation model 240 in a memory. The electronic device may estimate scene component information using the INR model 210, the albedo estimation model 230, and the specular estimation model 240. The INR model 210 may be a machine learning model (e.g., a neural network) configured and trained to output a global geometry feature 218 and surface identification information 219 in response to an input of point information 213. The albedo estimation model 230 may be a machine learning model configured and trained to output albedo information 231 in response to inputs of the global geometry feature 218, an object surface position 221, and normal information 222. The specular estimation model 240 may be a machine learning model configured and trained to output specular information 241 in response to inputs of the global geometry feature 218, the object surface position 221, the normal information 222, and a view direction 212. For reference, in the present specification, each machine learning model (e.g., the INR model 210, the albedo estimation model 230, the specular estimation model 240, and other machine learning model 250) may be a neural network trained based on deep learning, and may include, for example, a neural network having a multi-layer perceptron (MLP) structure. A network structure (e.g., a scene component estimation network) for estimating scene component information according to an example may be a structure in which the above-described machine learning models (e.g., the INR model 210, the albedo estimation model 230, the specular estimation model 240 and the other machine learning model 250) are connected and/or combined.

In the present specification, a neural network may include layers, and each of the layers may include a node. The node may have a node value determined based on an activation function. A node of an arbitrary layer may be connected to a node (e.g., another node) of another layer through a link (e.g., a connection edge) having a connection weight. The node value of the node may be propagated to other nodes via links. For example, in an inference operation of the neural network, node values may be propagated forward from a previous layer to a next layer. A node value of a corresponding node may be propagated (e.g., forward propagated) to a node (e.g., a next node) of a next layer connected to the node through a connection edge. For example, a node may receive a value weighted by a connection weight from previous nodes (e.g., a plurality of nodes) connected through a connection edge. The node value of the node may be determined based on a sum (e.g., a weighted sum) of weighted values received from the previous nodes, to which an activation function is applied. Parameters of the neural network may include, for example, the connection weight described above. The parameters of the neural network may be updated such that an objective function value that will be described below may be changed in a targeted direction, for example, to minimize a loss. A non-limiting example of an objective function will be described below with reference to FIG. 3.

According to an example, the electronic device may determine a viewpoint 211 and view directions 212 corresponding to image pixels of a 2D scene obtained by observing a 3D scene including an object at the viewpoint 211 in a FOV. A pixel position corresponding to each image pixel of an image (e.g., a 2D scene image) corresponding to a 2D scene may be determined based on a resolution of a 2D image to be reconstructed. As described above with reference to FIG. 1, the electronic device may determine the viewpoint 211, and determine a direction corresponding to the pixel position as a view direction 212. The electronic device may estimate scene component information 251 based on inputting of the viewpoint 211 and the view direction 212 corresponding to each image pixel to a scene component estimation network including the INR model 210.

For example, in operation 201, the electronic device may extract the global geometry feature 218 and information indicating whether a point is on a surface (e.g., the surface identification information 219), based on the INR model 210, from the viewpoint 211 and the view direction 212 corresponding to an image pixel corresponding to the 2D scene at the viewpoint 211 within the FOV. The electronic device may determine the point information 213 from the viewpoint 211 and the view direction 212 described above. The point information 213 may be information (e.g., coordinates of a point) about a point first encountered in the view direction 212 departing from the viewpoint 211 within a 3D space. The electronic device may extract the global geometry feature 218 and the surface identification information 219 from the point information 213 based on the INR model 210.

The global geometry feature 218 may be information (e.g., feature data or a feature vector) representing a feature that abstracts (or encodes) a geometry of a point indicated by the point information 213, and may be extracted from the point information 213 based on the INR model 210 as shown in FIG. 2B.

The surface identification information 219 may be information indicating whether the point indicated by the point information 213 is on a surface of an arbitrary object, and may also be referred to as information indicating whether a point is on a surface. In the present specification, the surface identification information 219 may have or include a value of a signed distance function (SDF). The SDF may have a value of “0” when the point indicated by the point information 213 is on a surface. When the point indicated by the point information 213 is inside a volume defined by the surface, the SDF may have a value indicating a shortest distance from the point to the surface using a negative sign (e.g., −). When the point indicated by the point information 213 is outside the volume defined by the surface, the SDF may have a value indicating the shortest distance from the point to the surface using a positive sign (e.g., +). However, in the present specification, while the surface identification information 219 is expressed as an SDF value for convenience of description, examples are not limited thereto.

According to an example, the electronic device may repeatedly or iteratively perform operation 201 on a point to which a ray is advanced in the view direction 212 by a distance determined based on ray marching until the surface identification information 219 indicates a surface (e.g., until the SDF has a value of “0”). For example, when the surface identification information 219 includes an SDF value (e.g., an SDF value less than or greater than “0”), the electronic device may perform an operation on the point information 213 indicating a position of a point to which a ray is advanced in the view direction 212 by the SDF value, based on the INR model 210. The electronic device may repeatedly or iteratively perform ray matching and estimation based on the INR model 210 until the SDF value becomes zero. A non-limiting example of the ray matching will be described with reference to FIG. 6 below. For reference, as described above, when the 3D point p is selected as a point with an SDF value of “0”, the 3D point P may also be referred to as a 3D surface point because the 3D point P is on a surface of an arbitrary object.

In operation 202, the electronic device may calculate (e.g., determine) the object surface position 221 corresponding to the viewpoint 211 and the view direction 212 and the normal information 222 of the object surface position 221, based on the information indicating whether the point is on the surface (e.g., the surface identification information 219). The electronic device may calculate the object surface position 221 and the normal information 222 from the surface identification information 219, the viewpoint 211, and the view direction 212. For example, the electronic device may use an analysis algorithm 220 to calculate the object surface position 221 and the normal information 222. The normal information 222 may include a normal value (e.g., a normal vector) at the calculated object surface position 221. The analysis algorithm 220 may include an analytic function having a gradient calculation based on the surface identification information 219, the viewpoint 211, and the view direction 212.

In operation 203, the electronic device may estimate the albedo information 231 independent of the view direction 212, based on the albedo estimation model 230, from the global geometry feature 218, the object surface position 221, and the normal information 222. For estimating the albedo information 231 using the albedo estimation model 230, the electronic device may exclude the view direction 212, and may perform an albedo estimation model-based operation (e.g., a neural network operation) on the global geometry feature 218, the object surface position 221, and the normal information 222.

In operation 204, the electronic device may estimate the specular information 241 dependent on the view direction 212, based on the specular estimation model 240, from the global geometry feature 218, the object surface position 221, the normal information 222, and the view direction 212. For estimating the specular information 241 using the specular estimation model 240, the electronic device may perform an operation using the specular estimation model 240 on the global geometry feature 218, the object surface position 221, and the normal information 222 together with the view direction 212.

Figure 3:
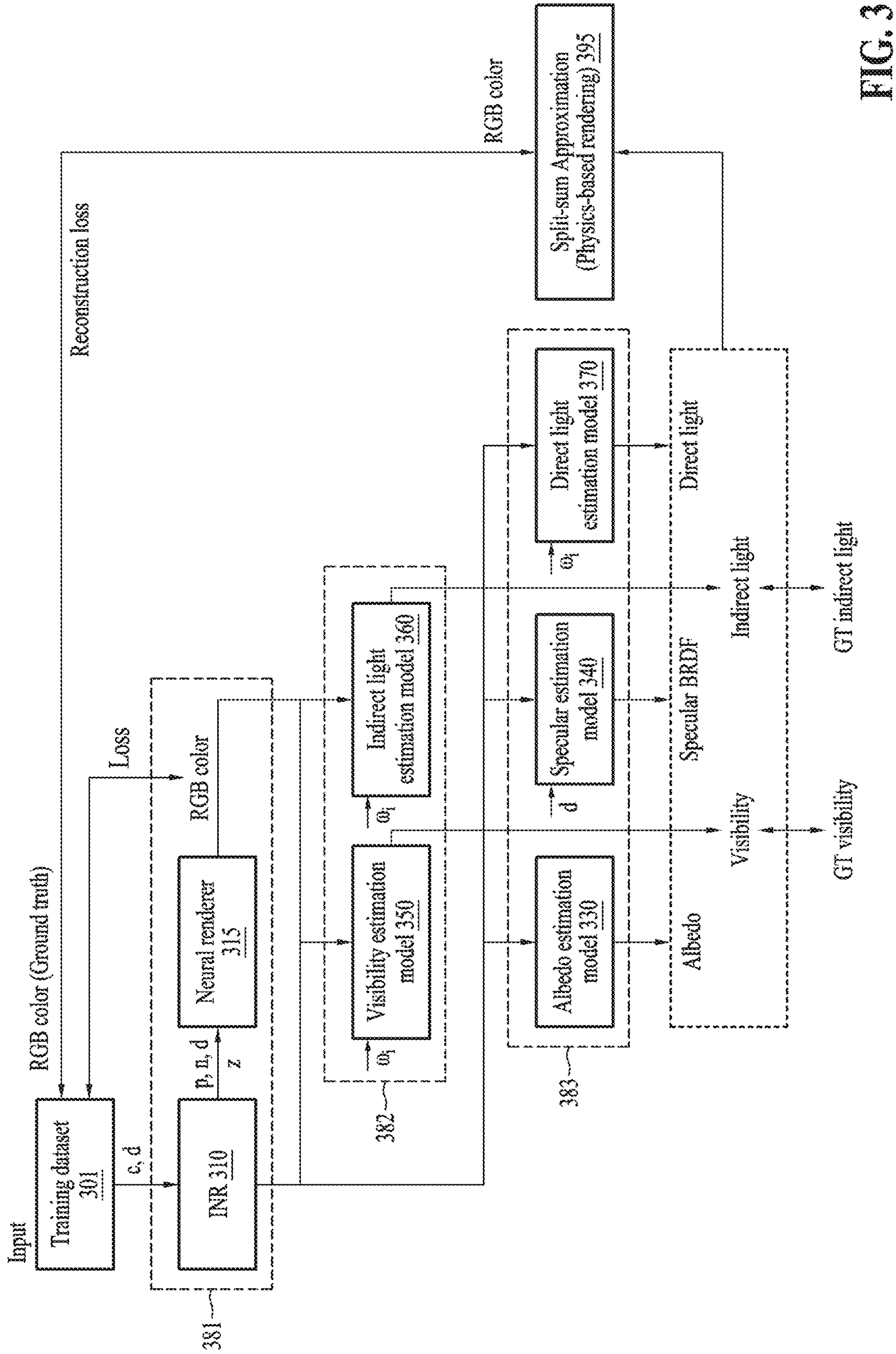
FIG. 3 illustrates an example of a scene component estimation network and training of the scene component estimation network.
Figure 8:
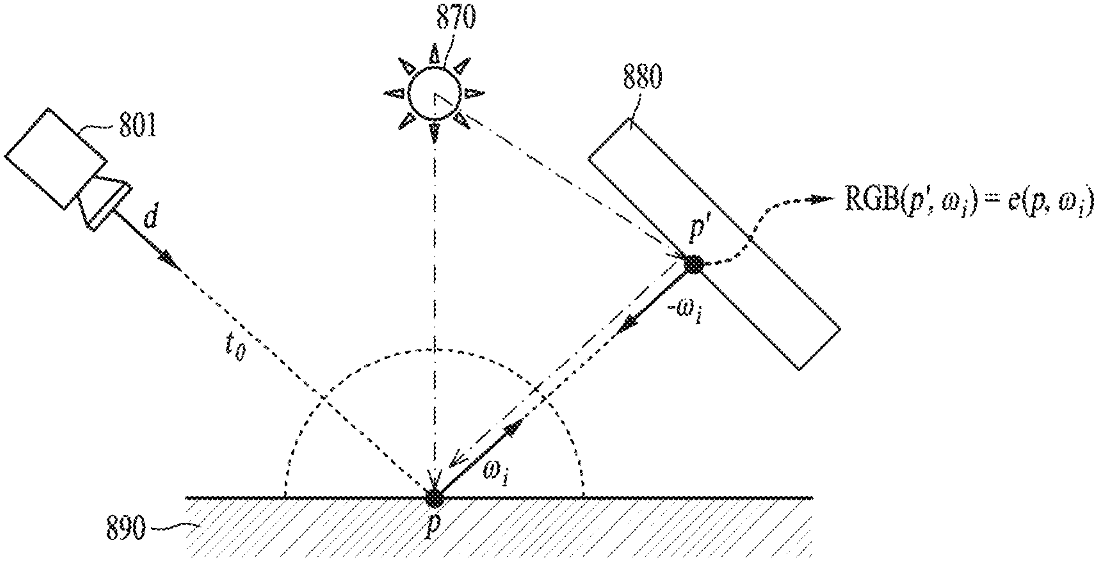
FIG. 8 illustrates an example of a propagation path of indirect light.
Figure 9:
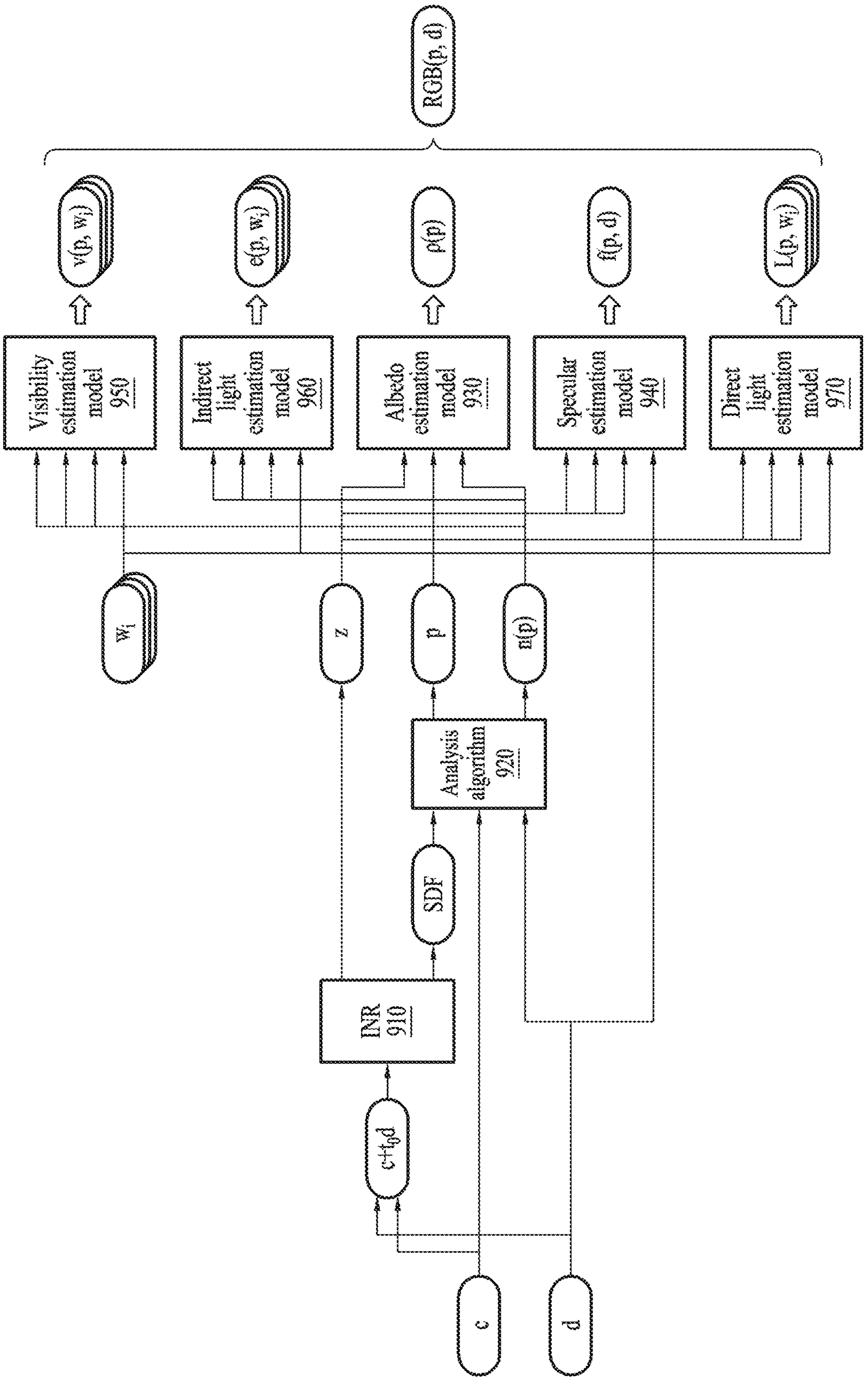
FIG. 9 illustrates an example of a scene component estimation network.

According to an example, the electronic device may estimate the scene component information 251 based on the machine learning model 250 from the global geometry feature 218, the object surface position 221, and the normal information 222, for ray directions 205 departing from the object surface position 221. The ray directions 205 may be all directions from the object surface position 221 (e.g., a direction toward points on a virtual hemisphere with the object surface position 221 as the center of the base of the hemisphere). A non-limiting example of the ray directions 205 will be described with reference to FIG. 8 below. The scene component information 251 shown in FIG. 2B may include, for example, visibility information, indirect light information, and direct light information among all scene component information (e.g., five physical properties). The machine learning model 250 shown in FIG. 2B may include a visibility estimation model, an indirect light estimation model, and a direct light estimation model as branches separated from each other, non-limiting examples of which are shown in FIGS. 3 and 9. The electronic device may individually estimate visibility information that is based on a visibility estimation model, indirect light information that is based on an indirect light estimation model, and direct light information that is based on a direct light estimation model from the global geometry feature 218, the object surface position 221, and the normal information 222, for the ray directions 205 departing from the object surface position 221.

According to an example, the electronic device may determine a pixel value 290 of an image pixel based on scene component information that includes at least one of visibility information, indirect light information, or direct light information, together with the albedo information 231 and the specular information 241. For example, the electronic device may calculate the pixel value 290 from the albedo information 231, the specular information 241, the visibility information, the indirect light information, and the direct light information based on Equation 16 or 17 shown below, for example. The electronic device may estimate scene component information including the albedo information 231 and the specular information 241 for view directions 212 corresponding to image pixels corresponding to a 2D scene from the viewpoint 211. The electronic device may generate a 2D image by determining pixel values 290 of image pixels using the scene component information estimated for the image pixels. The electronic device may obtain a 2D image by determining pixel values of all image pixels corresponding to a 2D scene.

In addition, the electronic device may adjust at least one scene component of the visibility information, the indirect light information, the direct light information, the albedo information 231, or the specular information 241, based on a user input. For example, when a user determines to generate an image under different lighting conditions, the electronic device may adjust at least one of the indirect light information or the direct light information based on a user input. The electronic device may determine a pixel value 290 of a pixel of a 2D image corresponding to the viewpoint 211 and the view direction 212 based on the adjusted scene component and an estimated scene component. For example, as described above, the electronic device may obtain a 2D image by determining pixel values of all image pixels corresponding to a 2D scene.

Hereinafter, an example of training a scene component estimation network through three operations is described with reference to FIG. 3.

FIG. 3 illustrates an example of a scene component estimation network and training of the scene component estimation network.

Although an electronic device (e.g., the electronic device 1000 of FIG. 10) may perform training for convenience of description herein, examples are not limited thereto. A device for training (e.g., a training device) may also be used separately from an electronic device for inference.

A training dataset 301 may include an image obtained by capturing a 3D space, and a viewpoint and a view direction in which the image is captured. The viewpoint and the view direction may be training inputs, and a pixel value of the image may be a ground truth (GT) as a training output. An image pixel value of the training dataset 301 may be referred to as a "GT pixel value". The electronic device may perform training of the scene component estimation network using a plurality of training datasets 301. For example, each of the plurality of training datasets 301 may include images obtained by capturing the same 3D space in various viewpoints and various view directions.

According to an example, the electronic device may sequentially perform a first training operation 381, a second training operation 382, and a third training operation 383. In the second training operation 382, parameters of an INR model 310 and a neural renderer 315 may be fixed, and parameters of a visibility estimation model 350 and an indirect light estimation model 360 may be updated. In the third training operation 383, parameters of an albedo estimation model 330, a specular estimation model 340, and a direct light estimation model 370 may be updated, and parameters of the INR model 310, the visibility estimation model 350, and the indirect light estimation model 360 may be fixed. For reference, the visibility estimation model 350, the indirect light estimation model 360, the albedo estimation model 330, the specular estimation model 340, and the direct light estimation model 370 may be branched from the INR model 310 as branches distinguished from each other.

In the first training operation 381, the electronic device may train the INR model 310 and the neural renderer 315. The neural renderer 315 may be a model (e.g., a neural network) configured and trained to output image pixel values (e.g., color values) corresponding to outputs of the above-described INR model 310. Parameters (e.g., connection weights between nodes) of the INR model 310 and the neural renderer 315 may be updated based on an objective function value (e.g. A loss function value) calculated between a GT pixel value of the training dataset 301 and a temporary pixel value 395 output by the neural renderer 315 in the first training operation 381. The temporary pixel value 395 may be a color value (e.g., an RGB value) inferred for a 3D point corresponding to a viewpoint and a view direction. The GT pixel value may be a color value (e.g., an RGB value as a GT color value) of a pixel position corresponding to a viewpoint and a view direction in an image of the training dataset 301. The objective function value may be an error between the inferred color value and the GT color value, and the parameters of the INR model 310 and the neural renderer 315 may be updated to reduce the error. A non-limiting example of the first training operation 381 will be described with reference to FIG. 4 below.

In the second training operation 382, the visibility estimation model 350 and the indirect light estimation model 360 may be trained. For example, in the second training operation 382, the trained INR model 310 obtained by the above-described first training operation 381 may be used. The electronic device may train the visibility estimation model 350 using outputs of the completely trained INR model 310. For example, the electronic device may calculate temporary visibility information based on the visibility estimation model 350 from light source directions together with the outputs of the completely trained INR model 310. A GT visibility value may be calculated, a non-limiting example of which will be described below with reference to FIG. 5, and accordingly the electronic device may update parameters (e.g., connection weights between nodes) of the visibility estimation model 350 using an objective function value calculated based on the GT visibility value and the temporary visibility information. Similarly, the indirect light estimation model 360 may be trained, a non-limiting example of which will be described with reference to FIG. 7 below.

In the third training operation 383, the albedo estimation model 330, the specular estimation model 340, and the direct light estimation model 370 may be trained. When the third training operation 383 is completed, the electronic device may extract all physical properties (e.g., scene component information) used to reconstruct an image pixel value for an arbitrary view direction at an arbitrary viewpoint through inference of each model. During runtime, the electronic device may estimate scene component information for an arbitrary viewpoint and view direction based on the INR model 310, the visibility estimation model 350, the indirect light estimation model 360, the albedo estimation model 330, the specular estimation model 340, and the direct light estimation model 370, and may render a scene based on the estimated scene component information, a non-limiting example of which will be described below with reference to FIG. 9. As described above, the rendering of the scene may include an operation of determining pixel values of image pixels included in the 2D scene.

In the third training operation 383, the albedo estimation model 330, the specular estimation model 340, and the direct light estimation model 370 may be additionally trained. The albedo estimation model 330 and the specular estimation model 340 may be models to estimate different types of physical material properties, respectively.

In an example, according to a rendering operation of a physical light reflection model, the physical material properties may be presented as a BRDF indicating that light energy incident in an arbitrary direction at an arbitrary 3D point is reflected in an arbitrary direction. Light reflection may be divided into diffuse reflection and specular reflection. The diffuse reflection may indicate that light energy coming in an arbitrary direction is absorbed into a surface and reflected with the same energy in all directions. The diffuse reflection may be observed as the same light reflection at all camera angles. The specular reflection may be a reflection in which incident light energy tends to be reflected from a surface in a limited direction (e.g., in one direction). In the specular reflection, observed light energy may vary depending on an angle of a camera facing a surface. In other words, the diffuse reflection may be independent of an angle of a camera (e.g., a view direction), but the specular reflection may be dependent on the view direction. As described above, the electronic device may estimate scene component information using a machine learning model of a branch separated according to a dependency on the view direction. The electronic device may estimate BRDF coefficients including a diffuse reflection parameter and a specular reflection parameter.

Albedo information output by the albedo estimation model 330 and specular information output by the specular estimation model 340 may be information associated with physical material properties (e.g., diffuse reflection and specular reflection) of a corresponding point (e.g., a 3D surface point where rays traveling in a view direction from an arbitrary viewpoint are encountered). The albedo information may include a value indicating a degree of diffuse reflection, and the specular information may include a value indicating a degree of specular reflection. Direct light information output by the direct light estimation model 370 may be information associated with a lighting condition and may indicate a color of a light source. For training of the albedo estimation model 330, the specular estimation model 340, and the direct light estimation model 370, the electronic device may extract visibility information and indirect light information based on the INR model 310, the visibility estimation model 350, and the indirect light estimation model 360 which are completely trained. The electronic device may additionally extract temporary albedo information, temporary specular information, and temporary direct light information, and may calculate the temporary pixel value 395 using the extracted scene component information.

The albedo information may include, for example, an albedo value related to diffuse reflection among BRDF coefficients, and the albedo value may be expressed as a color value (e.g., an RGB value) at a 3D point. The specular information may include a specular map representing a reflectivity of specular reflection for each of channels (e.g., RGB channels). The specular map may be a value field indicating a degree of reflection observed from camera views corresponding to a 3D point.

The direct light information may include color values of light coming to a corresponding 3D point in all directions.

According to an example, the albedo estimation model 330 and the specular estimation model 340 may be trained based on an objective function value between a GT 2D image and a temporary 2D image reconstructed based on the albedo information output from the albedo estimation model 330, the specular information output from the specular estimation model 340, and other scene component information output from other machine learning models. It may be difficult to substantially calculate GT values for the albedo information and the specular information. Values other than the albedo information and the specular information may be obtained by machine learning models that are completely trained in the first training operation 381 and the second training operation 382. The electronic device may apply the albedo information and the specular information to a rendering operation together with the other values obtained by the completely trained machine learning models. A pixel value for a corresponding 3D point may be calculated by the rendering operation. The electronic device may calculate a difference between the calculated pixel value and a GT pixel value of a corresponding pixel position in an image of the training dataset 301 as an objective function value. Since it is difficult to directly calculate GT values for the albedo information and the specular information, as described above, the electronic device may perform indirect supervised learning using the rendering operation together with other component values.

In the field of computer graphics for physics-based rendering, a typical electronic device may calculate a color value (e.g., an RGB value) at a corresponding 3D point by the rendering operation, where the rendering operation may have a high complexity. The high complexity may lead to a decrease in a probability of stable convergence in training. According to an example, in contrast to the typical electronic device, the electronic device of one or more embodiments may calculate a temporary color value from scene property information estimated using a rendering operation that is approximated and modified from the rendering operation. For example, the temporary 2D image may be reconstructed using an approximation (e.g., a split-sum approximation) that is based on a split of a rendering operation that determines an image pixel value based on scene component information into a reflection component and an illumination component. A non-limiting example of a rendering operation based on a BRDF will be described with reference to Equations 1 to 16 shown below, and a non-limiting example of the approximation will be described with reference to Equation 17 below.

The rendering operation based on the BRDF described above may be, for example, an operation that approximates reflection and refraction properties of a material based on the microfacet theory, and may be represented as shown in Equation 1 below, for example.

$$L_o(p, \omega_o) = \int_\Omega f_r(p, \omega_i, \omega_o) L(p, \omega_i)(\omega_i \cdot n) d\omega_i \quad \text{Equation 1}$$

In Equation 1, $L_0$ denotes a sum of light energy corresponding to light Li incident from an arbitrary 3D point p in all directions Q and output in an arbitrary reflection direction $w_o$ by a material reflectivity (e.g. A diffuse reflection coefficient $$k_d \frac{\rho}{\pi}$$

and a specular reflection coefficient $$\frac{DFG}{4(\omega_o \cdot n)(\omega_i \cdot n)}$$

of a BRDF). $w_i$ denotes a direction of an arbitrary ray departing from the 3D point p and may be one of light vectors corresponding to all the directions Ω. $w_o$ may be an outgoing vector and may be the same as a view vector viewed by a camera. When d is a view direction of the camera, "wo=–d" may be satisfied. In addition, n denotes a normal vector at the 3D point p, which is the same as n(p). Here, $L_0$ may be interpreted as a pixel value (e.g., an RGB color value) of a corresponding image pixel viewed at a viewpoint. $f_r$ may be expressed as in Equation 2 below, for example.

$$f_r = k_d f_{lambert} + k_s f_{cook-torrance} \quad \text{Equation 2}$$

Lambertian diffuse in Equation 2 described above may be represented as a constant factor as shown in Equation 3 below, for example.

$$f_{lambert} = \frac{\rho}{\pi}$$

In Equation 3, ρ denotes an albedo value. A factor $f_{cookTorrance}$ representing a Cook-Torrance BRDF in Equation 2 described above may be expressed as in Equation 4 below, for example.

$$f_{CookTorrance} = \frac{DFG}{4(\omega_o \cdot n)(\omega_i \cdot n)} \quad \text{Equation 4}$$

Equation 4 described above may be an equation that approximates a portion of reflection properties of a surface. In Equation 4, D denotes a normal distribution function, G denotes a geometry function, and F denotes a Fresnel equation. The normal distribution function D may be a distribution function of normal vectors and may be a probability value indicating a distribution of normal vectors of a microfacet at an arbitrary point p in the concept of the microfacet. D, G, and F are respectively described with reference to Equations 5 to 10 below, for example.

$$NDF_{GGXTR}(n, h, \alpha) = \frac{\alpha^2}{\pi\left((n \cdot h)^2(\alpha^2 - 1) + 1\right)^2} \quad \text{Equation 5}$$

$$h = \frac{\omega_i + \omega_o}{|\omega_i + \omega_o|} \quad \text{Equation 6}$$

Equation 5 described above may represent the normal distribution function D and indicate a value obtained by statistically approximating an amount of alignment of microfacets to a half vector h affected by a roughness of a surface. The half vector h is described with reference to Equation 6. The half vector h may be a unit vector pointing in a center direction of a view vector and a light vector, and may be a vector pointing in a center direction of $w_o$ (e.g., a vector corresponding to –d) and $w_i$. Also, n denotes a normal vector n(p).

$$G(n, \omega_o, \omega_i, k) = G_{sub}(n, \omega_o, k)\, G_{sub}(n, \omega_i, k) \quad \text{Equation 7}$$

$$G_{sub}(n, \omega, k) = G_{SchlickGGX}(n, \omega, k) = \frac{n \cdot \omega}{(n \cdot \omega)(1 - k) + k} \quad \text{Equation 8}$$

$$k = \frac{\alpha^2}{2} \quad \text{Equation 9}$$

In Equation 7 described above, the geometry function G may represent a value describing self-shadowing properties of a microfacet. Equation 8 may represent a sub-function of the geometry function G. k in Equation 8 is described with reference to Equation 9.

$$F = F_0 + (1 - F_o)(1 - \cos(\theta))^5 \quad \text{Equation 10}$$

$$F_0 = \left(\frac{\eta_1 - \eta_2}{\eta_1 + \eta_2}\right)^2 \quad \text{Equation 11}$$

Equation 10 represents the Fresnel equation F, which is a ratio of reflected light to refracted light, and may be approximated using a Fresnel-Schlick approximation. In Equation 11, $F_0$ may represent a level of base reflectivity when looking straight at a surface of a material.

$L(p, w_i)$ in Equation 1 described above may be expressed as in Equation 12 below, for example.

$$L(p, \omega_i) = L_{direct}(p, \omega_i) \cdot v(p, \omega_i) + L_{indirect}(p, \omega_i) \quad \text{Equation 12}$$

In Equation 12, a notation of $L_{direct}(p, w_i)$ denoting direct light may be changed to $L_i(p, w_i)$, and a notation of $L_{indirect}(p, w_i)$ denoting indirect light may be changed to $e(p, w_i)$, which may be expressed as in Equation 13 below, for example.

$$L(p, \omega_i) = L_i(p, \omega_i) \cdot v(p, \omega_i) = e(p, \omega_i) \quad \text{Equation 13}$$

In Equation 13, $L(p, w_i)$ may represent all light coming in all directions to an arbitrary point p, and may be classified as direct light information $L_i(p, w_i)$, visibility information $v(p, w_i)$, and indirect light information $e(p, w_i)$. $L(p, w_i)$ may be a component obtained by adding the indirect light information $e(p, w_i)$ to a product of the direct light information $L_i(p, w_i)$ and the visibility information $v(p, w_i)$.

In addition, $f_r(p, w_i, w_o)$ in Equation 1 described above may be expressed as in Equation 14 below, for example.

$$f_r(p, \omega_i, \omega_o) = k_d\frac{\rho}{\pi} + \frac{DFG}{4(\omega_o \cdot n)(\omega_i \cdot n)} \quad \text{Equation 14}$$

Equation 14 may be divided into a diffuse BRDF and a specular BRDF. A notation of $k_d\rho$ in the diffuse BRDF is expressed as in Equation 15 below using albedo information ($\rho(p)$), and a notation of DFG in the specular BRDF is expressed as in Equation 15 below, for example, using the specular information f(p, d).

$$f_r(p, \omega_i, \omega_o) = \frac{\rho(p)}{\pi} + \frac{f(p, d)}{4(\omega_o \cdot n)(\omega_i \cdot n)} \quad \text{Equation 15}$$

Therefore, an expression of the rendering operation according to Equation 1 may be summarized as shown in Equation 16 below, for example.

$$L_o(p, \omega_o) = \frac{\rho(p)}{\pi}\int_\Omega \{(L_i(p, \omega_i)\cdot v(p, \omega_i) + e(p, \omega_i))(\omega_i \cdot n)\}d\omega_i + \int_\Omega\left\{\frac{f(p, d)}{4(\omega_o \cdot n)(\omega_i \cdot n)}(L_i(p, \omega_i)\cdot v(p, \omega_i) + e(p, \omega_i))(\omega_i \cdot n)\right\}d\omega_i \quad \text{Equation 16}$$

Equation 1 described above may be summarized as Equation 16 according to Equations 2 through 15. Equation 16 described above may be expressed as Equation 17 shown below, for example, based on the split-sum approximation.

$$L_o(p, \omega_o) = \frac{\rho(p)}{\pi}\int_\Omega \{(L_i(p, \omega_i)\cdot v(p, \omega_i) + e(p, \omega_i))(\omega_i \cdot n)\}d\omega_i + \int_\Omega\left\{\frac{f(p, d)}{4(\omega_o \cdot n)(\omega_i \cdot n)}(\omega_i \cdot n)\right\}d\omega_i \int_\Omega \{(L_i(p, \omega_i)\cdot v(p, \omega_i) + e(p, \omega_i))(\omega_i \cdot n)\}d\omega_i \quad \text{Equation 17}$$

In Equation 17, $\rho(p)/\pi$ denotes a diffuse reflection component, and $$\frac{f(p, d)}{4(\omega_o \cdot n)(\omega_i \cdot n)}$$

denotes a specular reflection component. Therefore, in Equation 17, the BRDF (e.g., f (p, d)) and light properties (e.g., $L_i$, v, and e) may be individually bundled as independent integral terms by the split-sum approximation, and a dependency between components may be further reduced. This is because a reflection component and an illumination component are separated.

For reference, Equations 1 to 16 are used to represent a process of deriving Equation 17. The electronic device may use outputs of the scene component estimation network that will be described below as values corresponding to each variable or a combination of variables in Equation 17. For example, $V_i(p, w_i)$ in Equation 17 may be a visible distance from an object surface position p in a ray direction $w_i$ as visibility information, and may be estimated by a visibility estimation model. $L_i(p, w_i)$, which is direct light information, may indicate a color value of direct light received from the object surface position p in the ray direction $w_i$ and may be estimated by a direct light estimation model. Among diffuse reflection components, $\rho(p)$ may correspond to albedo information estimated by an albedo estimation model that will be described below. Among specular reflection components, f(p,d) may correspond to specular information estimated by a specular estimation model.

According to an example, the electronic device may perform a calculation by converting a continuous integral term of Equation 17 described above into a discrete sigma sum based on Monte-Carlo estimation.

In the third training operation 383, the electronic device may calculate the temporary pixel value 395 based on Equation 17 from scene component information corresponding to temporary outputs 390 of each machine learning model. The electronic device may calculate a loss function value (e.g., a reconstruction loss) corresponding to a difference between the temporary pixel value 395 and the GT pixel value. The electronic device may update parameters (e.g., connection weights between nodes) of the albedo estimation model 330, the specular estimation model 340, and the direct light estimation model 370 so that the loss function value may be reduced. Therefore, a stability of training in the third training operation 383 may be further enhanced.

Figure 4:
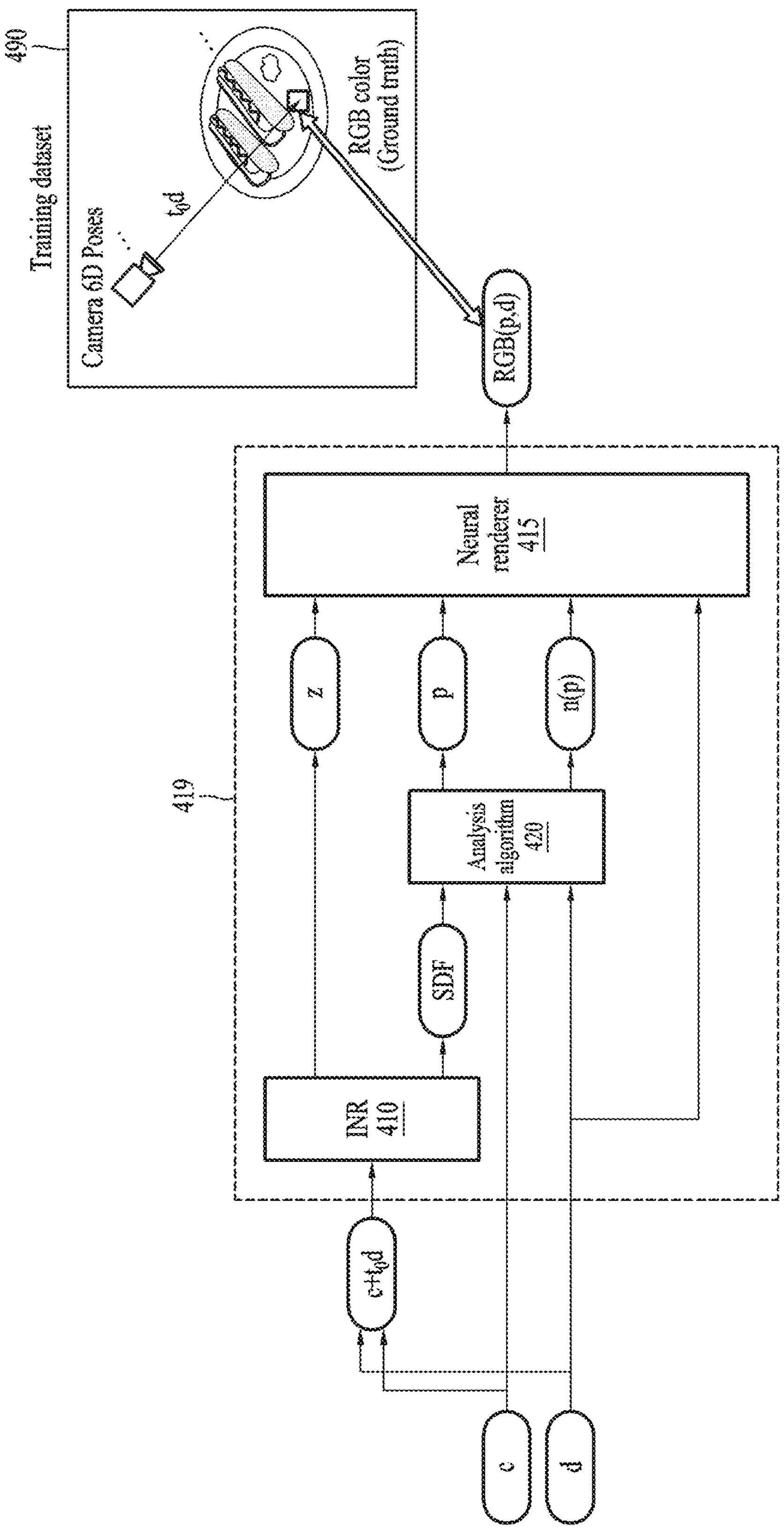
FIG. 4 illustrates an example of a neural rendering model and training of the neural rendering model.

FIG. 4 illustrates an example of a neural rendering model and training of the neural rendering model.

According to an example, in a first training, an electronic device (e.g., the electronic device 1000 of FIG. 10) may estimate an image pixel value based on a neural rendering model 419 that includes an INR model 410 and a neural renderer 415. For reference, when the neural renderer 415 receives a global geometry feature z, an object surface position p, and normal information n(p) (e.g., a normal vector) as inputs, only an image representing a scene in which physical materials or lighting conditions are fixed may be reconstructed. In a scene component estimation network shown in FIG. 9 described below, the neural renderer 415 is excluded, and other machine learning models for estimating scene component information may be used.

The electronic device may determine a point spaced apart from a viewpoint c in a view direction d. As described above, the view direction d may correspond to an image pixel at an arbitrary pixel position within a 2D scene. Coordinates of the point spaced apart from the viewpoint c in the view direction d may be expressed as $c+t_0d$. Each of the viewpoint c and the view direction d may be expressed as a vector according to a 3D coordinate system. $t_0$ may represent a distance away from the viewpoint c.

The electronic device may generate a global geometry feature z corresponding to the determined point and distance information SDF on a distance between the determined point and an object surface, based on the INR model 410. As described above with reference to FIG. 3, the distance information SDF on the distance between the determined point and the object surface may be an example of surface identification information. As described above, the distance information SDF of "0" may indicate that the point is on the object surface.

The electronic device may calculate normal information n(p) of the determined point by analyzing information indicating whether the determined point is on a surface, the viewpoint c, and the view direction d. For example, the electronic device may calculate the object surface position p and normal information n(p) from the distance information SDF, the viewpoint c, and the view direction d, through an analysis algorithm 420. Based on the neural renderer 415, the electronic device may determine a pixel value (e.g., a color value) (RGB(p, d)) of a corresponding image pixel from the global geometry feature z, the object surface position p, and the normal information n(p).

In the above operation, the distance $t_0$ may also be determined as a distance between the viewpoint c and the object surface. In other words, the object surface position p and the coordinates of the point spaced apart from the viewpoint c may ideally be the same. However, before the first training is completed, it may be difficult to guarantee the object surface position p that is based on an output of the INR model 410 as an object surface, and difficult to determine the distance $t_0$. Accordingly, when the first training is initiated, the electronic device may set the distance $t_0$ to an arbitrary value. At a point in time in which the first training is initiated, only the viewpoint c and the view direction d may be given. The electronic device may temporarily determine the coordinates $c+t_0d$ of the point spaced apart from the viewpoint c using an arbitrarily set distance $t_0$. The electronic device may temporarily estimate the distance information SDF and the global geometry feature z by inputting the temporarily determined coordinates $c+t_0d$ to the INR model 410. The electronic device may adjust a temporary distance $t_0$, which is temporarily away from the viewpoint c, until temporary distance information SDF becomes zero. Here, the temporary distance $t_0$ may be adjusted based on ray marching that will be described below with reference to FIG. 6, however, examples are not limited thereto.

The electronic device may estimate a temporary object surface position p from the viewpoint c, the view direction d, and the temporary distance information SDF through the analysis algorithm 420. The electronic device may estimate a temporary pixel value through the neural renderer 415 using the temporary object surface position p. The electronic device may estimate temporary pixel values of image pixels included in a 2D scene, as described above. The electronic device may update parameters (e.g., connection weights between nodes) of the INR model 410 and the neural renderer 415 based on a loss between the temporary pixel values and GT pixel values of a training dataset 490. The electronic device may update the parameters of the INR model 410 and the neural renderer 415 based on a backpropagation so that a calculated loss may be reduced.

For reference, when the first training has not been completed yet, it may be difficult to guarantee the temporary distance $t_0$ to be a distance from the viewpoint c to the object surface, even though the above-described temporary distance information SDF is "0". In other words, the temporary object surface position p may not be a position on the object surface. The electronic device may update the temporary distance $t_0$ as well as the parameters of the INR model 410 and the neural renderer 415 so that the loss may be reduced during the above-described backpropagation process.

Therefore, the INR model 410 may be trained based on an output of the neural renderer 415 that estimates a pixel value of an image pixel from the global geometry feature z, the object surface position p, the normal information n(p), and the view direction d. The completely trained INR model 410 may be used in other training operations (e.g., second and third training operations) and an inference operation along with the analysis algorithm 420 for calculating the normal information n(p).

Figure 5:
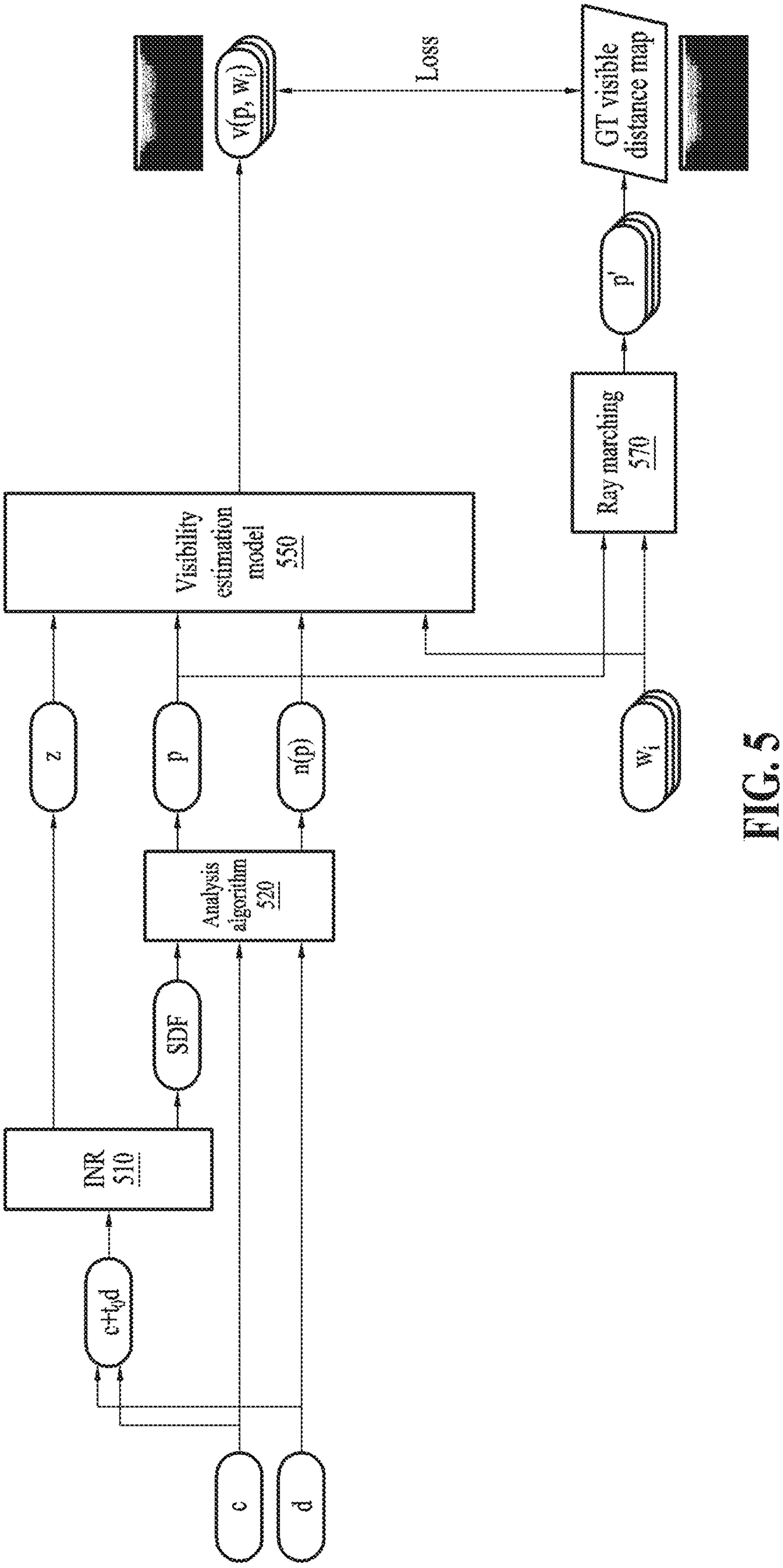
FIG. 5 illustrates an example of a visibility estimation model and training of the visibility estimation model.

FIG. 5 illustrates an example of a visibility estimation model and training of the visibility estimation model.

According to an example, an electronic device (e.g., the electronic device 1000 of FIG. 10) may obtain a global geometry feature z, an object surface position p, and normal information n(p) with respect to a viewpoint c and a view direction d based on an INR model 510 and an analysis algorithm 520. The INR model 510 may be completely trained through the first training operation described above with reference to FIG. 4. The electronic device may estimate visibility information based on a visibility estimation model 550 from ray directions $w_i$ together with the global geometry feature z, the object surface position p, and the normal information n(p). The ray directions $w_i$ may be directions of rays departing from the object surface location p. A non-limiting example of the ray directions $w_i$ will be described with reference to FIG. 8 below. The visibility information may indicate a degree to which light energy is received in all directions at an arbitrary object surface position p. The visibility information may indicate whether light enters for each direction or whether light does not enter because the light is covered by another object.

In a second training, the electronic device may determine GT visible distances for training of the visibility estimation model 550. According to an example, the visibility estimation model 550 may be trained using visible distances between the object surface position p and arrival points determined based on ray marching 570 for the ray directions $w_i$ departing from the object surface position p. For example, the electronic device may determine the object surface position p based on the completely trained INR model 510 and the analysis algorithm 520. The electronic device may perform the ray marching 570 from the object surface position p in the ray directions $w_i$. As a result of the ray marching 570, the electronic device may determine arrival points p' for each ray direction. The electronic device may determine a visible distance map including visible distances from the object surface position p to the arrival points p' as a GT visible distance map.

The electronic device may update parameters (e.g., connection weights between nodes) of the visibility estimation model 550 based on an objective function value (e.g., a loss function value) between a GT visible distance map and temporary visibility information (e.g., a temporary visible distance map) ($v(p, w_i)$) output based on the visibility estimation model 550. The electronic device may repeatedly or iteratively update the parameters of the visibility estimation model 550 based on a backpropagation so that a loss may be reduced.

For reference, each space in a visible distance map as visibility information may correspond to an arbitrary ray direction departing from the object surface position p, and a value assigned to a corresponding space may indicate a visible distance. In FIG. 5, a white space represents a value of "1", and a black space represents a value of "0". The value of "1" may indicate a presence of light and the value of "0" may indicate an absence of light. In other words, the black space may indicate a direction in which a visible distance is limited by an obstacle, and a white space may indicate a direction in which a visible distance is secured.

Figure 6:
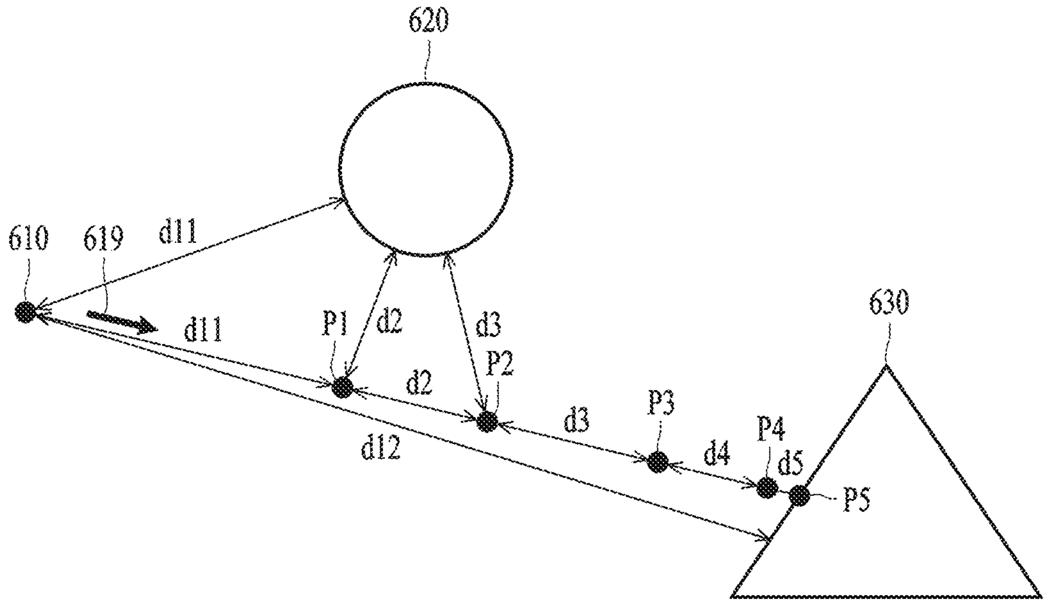
FIG. 6 illustrates an example of ray marching.

Although a considerable amount of time may be used to perform an operation of a visible distance map based on the ray marching 570, an amount of time used to estimate visibility information may be reduced through the visibility estimation model 550 that is completely trained. FIG. 6 illustrates an example of ray marching.

According to an example, ray marching may be an algorithm (e.g., sphere tracing) that iteratively performs an operation of advancing rays, by a minimum distance among distances from an arbitrary point to surrounding object surfaces, from a corresponding point in a target direction 619. For example, referring to FIG. 6, a minimum distance between distances d11 and d12 (e.g., SDF values) from a starting point 610 to surrounding objects 620 and 630 may be the distance d11 to the object 620. In the ray marching, a point P1 to which a ray is advanced by the distance d11 from the starting point 610 in the target direction 619 (e.g., a ray direction) may be determined. Similarly, at the point P1, a minimum distance d2 to the objects 620 and 630 may be determined, and rays may be advanced by the minimum distance d2. By repeatedly or iteratively performing the above-described operation at points P2, P3, and P4, rays may be advanced by distances d3, d4, and d5, to reach a surface position P5 on the object 630.

Referring to the example described above with reference to FIG. 5, the electronic device may perform ray marching from the object surface position p in each ray direction $w_i$ to calculate GT visibility information. Through the ray marching, the electronic device may determine a first encountered position p' in a corresponding ray direction $w_i$ from the object surface position p. The electronic device may repeatedly or iteratively perform ray marching with respect to ray directions.

In addition, the electronic device may perform ray marching in an inference operation, a non-limiting example of which will be described with reference to FIG. 9 below. For example, in FIG. 4, the distance $t_0$ to the object surface may be updated based on the backpropagation during the first training, but in an actual inference operation, a distance from a viewpoint to an object surface in the view direction is not given. Accordingly, the electronic device may obtain an object surface position by repeatedly or iteratively performing ray marching based on information indicating whether a point is on a surface from a viewpoint in a view direction. For example, the electronic device may obtain an SDF value by setting an initial separation distance in a view direction from a viewpoint during inference and by applying an INR model to a point (e.g., $c+t_0d$) determined based on the initial separation distance. When the SDF value is not zero, the electronic device may apply the INR model to a newly determined point (e.g., $c+t_0d$) by increasing to by the obtained SDF value. The electronic device may determine a distance from the viewpoint to an object surface in the view direction by repeatedly or iteratively performing the above-described operation until the SDF value becomes zero.

Figure 7:
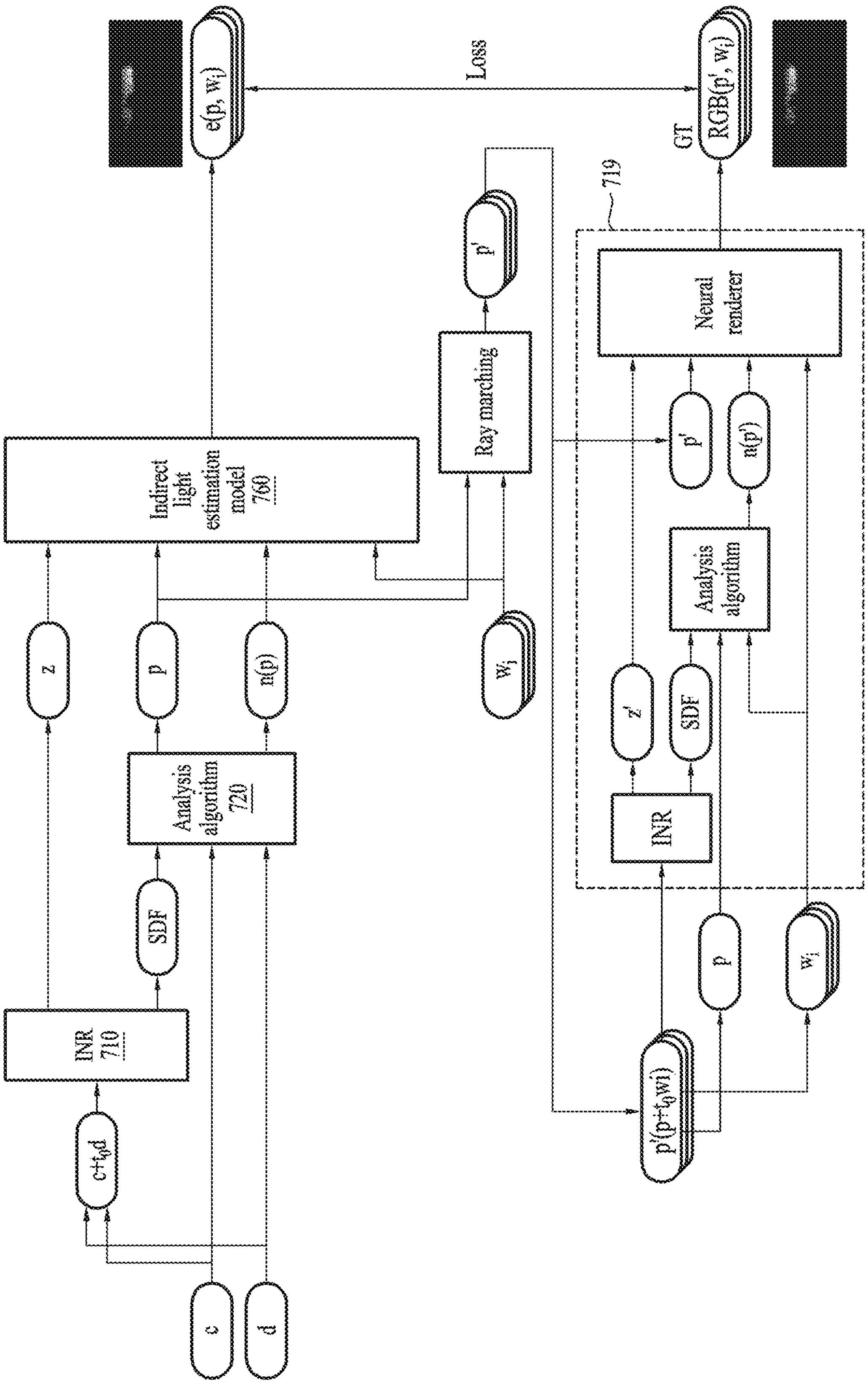
FIG. 7 illustrates an example of an indirect light estimation model and training of the indirect light estimation model.

FIG. 7 illustrates an example of an indirect light estimation model and training of the indirect light estimation model. FIG. 8 illustrates an example of a propagation path of indirect light.

According to an example, an electronic device (e.g., the electronic device 1000 of FIG. 10) may obtain a global geometry feature z, an object surface position p, and normal information n(p) with respect to a viewpoint c and a view direction d based on an INR model 710 and an analysis algorithm 720. The INR model 710 may be completely trained through the first training operation described above with reference to FIG. 4. The electronic device may estimate indirect light information based on an indirect light estimation model 760 from the global geometry feature z, the object surface position p, and the normal information n(p). Indirect light may be light received after light from a light source 870 is reflected by another object. The indirect light information may be information on indirect light reflected from a surrounding object 880 and reaching the object surface position p, and may include colors of a point on the surrounding object 880 from which light received at the object surface position p departs. For example, the indirect light information may include a color map including colors of points p' at which rays traveling in ray directions from the object surface location p arrive. FIG. 8 illustrates an example of a propagation path of indirect light. An object surface position p may be a position of a point spaced apart from a viewpoint 801 by a distance $t_0$ in a view direction d, and may indicate a position on a surface of an object 890. Referring to FIG. 8, a color value RGB(p', $w_i$) corresponding to a point p' at which a ray arrives in a ray direction $w_i$ departing from the object surface position p may be interpreted as an indirect light color value e(p, $w_i$) for the ray direction $w_i$ of the object surface position p. For reference, in the present specification, ray directions (e.g., the ray direction $w_i$) may include all directions outwardly from the surface except for directions from the object surface position p inwardly to the surface. Ray directions are directions toward a hemisphere with the object surface position p as a center as shown in FIG. 8, however, examples are not limited thereto. The ray directions may vary depending on a geometric shape of an object surface.

The electronic device may obtain GT indirect light information based on ray marching and a scene rendering model 719. For example, the indirect light estimation model 760 may be trained based on color information of arrival points p' at which rays departing from the object surface position p arrive, viewed from the object surface position p. The color information of the arrival points p' for training of the indirect light estimation model 760 may be estimated using the INR model 710 and a neural renderer which are completely trained. For example, the electronic device may calculate the arrival points p' based on ray marching from the object surface position p and ray directions based on the completely trained INR model 710 and the analysis algorithm 720. For reference, in the ray marching, both coordinates of the arrival points p' and distances to the arrival points p' may be calculated. Accordingly, the electronic device may also separate the object surface position p and a corresponding ray direction $w_i$ from the coordinates of the arrival points p'. The electronic device may calculate the GT indirect light information based on the scene rendering model 719 that is completely trained as described above with reference to FIG. 4. The electronic device may calculate a color value of an arrival point p' by inputting the arrival point p' to the scene rendering model 719. The electronic device may determine the color value of the arrival point p' as GT indirect light information. In FIG. 7, the GT indirect light information may be expressed as a set of color values RGB(p', $w_i$) corresponding to a point p' at which a ray arrives in the ray direction $w_i$ departing from the object surface position p. Temporary indirect light information may be expressed as an indirect light color value e(p, $w_i$) estimated for the ray direction $w_i$ of the object surface position p.

An output of the indirect light estimation model 760 that is not completely trained in the second training may also be referred to as temporary indirect light information. The electronic device may update parameters (e.g., connection weights between nodes) of the indirect light estimation model 760 based on an objective function value (e.g., a loss function value) between the temporary indirect light information and the GT indirect light information. The electronic device may repeatedly or iteratively update the parameters of the indirect light estimation model 760 based on a backpropagation so that a loss may be reduced.

FIG. 9 illustrates an example of a scene component estimation network.

In a third training, an electronic device (e.g., the electronic device 1000 of FIG. 10) may train an albedo estimation model 930, a specular estimation model 940, and a direct light estimation model 970. As described above, when a visibility estimation model 950, an indirect light estimation model 960, and an INR model 910 are completely trained, the other machine learning models may be trained. During the third training, the electronic device may estimate visibility information $v(p, w_i)$ that is based on the visibility estimation model 950 and indirect light information $e(p, w_i)$ that is based on the indirect light estimation model 960 together with temporary albedo information ρ(p) that is based on the albedo estimation model 930, temporary specular information f(p, d) that is based on the specular estimation model 940, and temporary direct light information $L(p, w_i)$ that is based on the direct light estimation model 970. The electronic device may determine a temporary pixel value based on Equation 17 described above from the temporary albedo information ρ(p), the temporary specular information f(p, d), the temporary direct light information $L(p, w_i)$, the visibility information $v(p, w_i)$, and the indirect light information $e(p, w_i)$. The electronic device may determine temporary pixel values of image pixels corresponding to a 2D scene. The electronic device may update parameters (e.g., connection weights between nodes) of the albedo estimation model 930, the specular estimation model 940, and the direct light estimation model 970 based on a difference between the temporary pixel values and GT pixel values of a training dataset. For example, the electronic device may repeatedly or iteratively update the parameters of the albedo estimation model 930, the specular estimation model 940, and the direct light estimation model 970 based on a backpropagation so that a difference (e.g., a difference between pixel values) between calculated images may be reduced.

When the third training is completed, the electronic device may reconstruct a scene image based on the completely trained scene component estimation network. The completely trained scene component estimation network may be interpreted as a network that may represent an arbitrary 3D space.

For example, the electronic device may determine a viewpoint c and a view direction d determined by a user, based on a user input. The electronic device may estimate a global geometry feature z, an object surface position p, and normal information n(p) based on an INR model 910 and an analysis algorithm 920, from the viewpoint c and the view direction d. For reference, as described above, when a distance from the viewpoint c to an object surface is not given in scene estimation, the electronic device may determine a distance $t_0$ to the object surface by repeatedly or iteratively performing ray marching. For example, the electronic device may obtain an SDF value by inputting a temporary point on the view direction d determined using an arbitrary initial distance into the INR model 910. When the SDF value is not zero, the electronic device may update a point on the view direction d by performing ray marching as much as the obtained SDF value. The electronic device may determine the object surface position p by estimating the SDF value based on the INR model 910 and repeatedly or iteratively performing ray marching based on the estimated SDF value.

The electronic device may estimate the albedo information ρ(p) based on the albedo estimation model 930 from the global geometry feature z, the object surface position p, and the normal information n(p). The electronic device may estimate the visibility information $v(p, w_i)$, the indirect light information $e(p, w_i)$, the specular information f(p, d), and the direct light information $L(p, w_i)$ based on the visibility estimation model 950, the indirect light estimation model 960, the specular estimation model 940, and the direct light estimation model 970 from ray directions $w_i$, in addition to the global geometry feature z, the object surface position p, and the normal information n(p). The electronic device may reconstruct an image pixel value RGB(p, d) from the above estimated scene component information. For example, the electronic device may calculate the image pixel value RGB (p, d) based on Equation 17 from the estimated scene component information. The electronic device may generate a 2D scene image by calculating all image pixel values RGB(p, d) corresponding to a 2D scene.

In addition, as described above, the electronic device may adjust a portion of the scene component information and reconstruct the image pixel value RGB(p, d) based on the adjusted scene component information. Thus, the electronic device may also reconstruct an image to a scene of an environment different from the training dataset.

Figure 10:
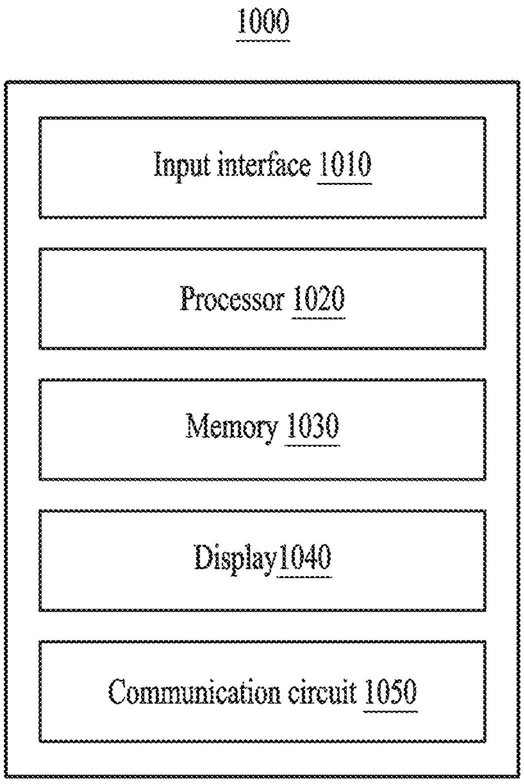
FIG. 10 illustrates an example of a configuration of an electronic device.

FIG. 10 illustrates an example of a configuration of an electronic device.

Referring to FIG. 10, the electronic device 1000 may include an input interface 1010, a processor 1020 (e.g., one or more processors), a memory 1030 (e.g., one or more memories), a display 1040, and a communication circuit 1050. The electronic device 1000 may be a device that performs training of the scene component estimation network described above with reference to FIGS. 1 through 9 and/or inference using the scene component estimation network. The electronic device 1000 may be, for example, an image processing device, a smartphone, a wearable device, a tablet computer, a netbook, a laptop, a desktop, or a personal digital assistant (PDA).

The input interface 1010, the processor 1020, the memory 1030, the display 1040, and the communication circuit 1050 may communicate with each another via a communication bus.

The input interface 1010 may receive an input from a user through a haptic, video, audio, or touch input. The input interface 1010 may include, for example, a keyboard, a mouse, a touch screen, a microphone, or any other device that detects an input from the user and transmits the detected input.

The processor 1020 may execute functions and instructions to be executed in the electronic device 1000 (e.g., a computing device). For example, the processor 1020 may process instructions stored in the memory 1030. The processor 1020 may extract a global geometry feature and information indicating whether a point is on a surface, based on an INR model, from a viewpoint and a view direction corresponding to an image pixel corresponding to a 2D scene at the viewpoint within a FOV. The processor 1020 may calculate an object surface position corresponding to the viewpoint and the view direction and normal information of the object surface position based on the information indicating whether the point is on the surface. The processor 1020 may estimate albedo information independent of the view direction based on an albedo estimation model from the global geometry feature, the object surface position, and the normal information. The processor 1020 may estimate specular information dependent on the view direction based on a specular estimation model from the global geometry feature, the object surface position, the normal information, and the view direction. The processor 1020 may perform the at least one operation described above with reference to FIGS. 1 through 9.

The processor 1020 may perform training using a loss function that is based on a split-sum approximation-based rendering operation in which a material integral term and a light integral term are separated to stabilize complex inverse rendering training in a training process. In addition, the processor 1020 of one or more embodiments may utilize global geometry features learned in an initial stage as main information to extract BRDF and light properties in a next training stage based on sequential learning rather than a typical processor which trains uses integrated learning.

The memory 1030 may store information or data used for execution of the processor 1020. For example, the memory 1030 may include the above-described machine learning models. The memory 1030 may store an INR model, an analysis algorithm, a visibility estimation model, an indirect light estimation model, an albedo estimation model, a specular estimation model, and a direct light estimation model. In addition, the memory 1030 may store a neural renderer and a training dataset for training. As described above, the albedo estimation model and the specular estimation model may be separated according to a view dependency. The memory 1030 may include a non-transitory computer-readable storage medium or a non-transitory computer-readable storage device. The memory 1030 may store instructions to be executed by the processor 1020 and may store related information while software and/or an application is executed by the electronic device 1000. For example, the memory 1030 may store instructions that, when executed by the processor 1020, configure the processor 1020 to perform any one, any combination, or all of the operations and methods described herein with reference to FIGS. 1-10.

The display 1040 may visually provide an output of the electronic device 1000 to a user. For example, the display 1040 may display a 2D scene image reconstructed by the processor 1020.

The communication circuit 1050 may communicate with an external device through a wired or wireless network. The communication circuit 1050 may receive the above-described machine learning models and parameters (e.g., completely trained parameters) of each of the machine learning models from an external device (e.g., a server).

The electronic devices, input interfaces, processors, memories, displays, communication circuits, electronic device 1000, input interface 1010, processor 1020, memory 1030, display 1040, communication circuit 1050, and other apparatuses, devices, and components described and disclosed herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An electronic device comprising:

one or more processors configured to:

extract, using an implicit neural representation (INR) model, a global geometry feature and information indicating whether a point is on a surface of an object from a viewpoint and a view direction corresponding to an image pixel corresponding to a two-dimensional (2D) scene at the viewpoint within a field of view (FOV);

determine an object surface position corresponding to the viewpoint and the view direction and normal information of the object surface position based on the information indicating whether the point is on the surface;

estimate, using an albedo estimation model, albedo information independent of the view direction from the global geometry feature, the object surface position, and the normal information;

estimate, using a specular estimation model, specular information dependent on the view direction from the global geometry feature, the object surface position, the normal information, and the view direction;

estimate, using an indirect light estimation model, indirect light information from the global geometry feature; and determine a pixel value of the image pixel based on scene component information including visibility information together with the albedo information and the specular information, the visibility information including the indirect light information, wherein the albedo estimation model and the specular estimation model are trained based on an objective function value between a ground truth (GT) 2D image and a temporary 2D image reconstructed using an approximation that is based on a split of a rendering operation for determining a pixel value into a reflection component and an illumination component.

2. The electronic device of claim 1, wherein the one or more processors are configured to determine the pixel value of the image pixel further based on direct light information together with the albedo information and the specular information.

3. The electronic device of claim 2, wherein the one or more processors are configured to estimate, using a machine learning model, the scene component information from the global geometry feature, the object surface position, and the normal information, for ray directions from the object surface position.

4. The electronic device of claim 2, wherein, for the determining of the pixel value, the one or more processors are configured to individually estimate the visibility information using a visibility estimation model, and the direct light information using a direct light estimation model from the global geometry feature, the object surface position and the normal information, for ray directions departing from the object surface position.

5. The electronic device of claim 1, wherein the one or more processors are configured to:

estimate scene component information including albedo information and specular information for view directions corresponding to image pixels corresponding to the 2D scene from the viewpoint; and generate a 2D image by determining pixel values of the image pixels using scene component information estimated for the image pixels.

6. The electronic device of claim 1, wherein the one or more processors are configured to:

adjust at least one scene component of visibility information, the indirect light information, direct light information, the albedo information, and the specular information, based on a user input; and determine a pixel value of a pixel of a 2D image corresponding to the viewpoint and the view direction based on the adjusted scene component and an estimated scene component.

7. The electronic device of claim 1, wherein the one or more processors are configured to obtain the object surface position by repeatedly performing a ray marching based on the information indicating whether the point is on the surface, in the view direction from the viewpoint.

8. The electronic device of claim 1, wherein the one or more processors are configured to:

determine a point spaced apart from the viewpoint in the view direction; and generate, using the INR model, a global geometry feature corresponding to the determined point and distance information on a distance between the determined point and an object surface.

9. The electronic device of claim 8, wherein the one or more processors are configured to determine normal information of the determined point by analyzing the viewpoint, the view direction, and information indicating whether the determined point is on a surface.

10. The electronic device of claim 1, wherein the INR model is trained based on an output of a neural renderer, and the neural renderer is configured to estimate a pixel value of an image pixel from the global geometry feature, the object surface position, the normal information, and the view direction.

11. The electronic device of claim 1, wherein the one or more processors are configured to estimate visibility information using a visibility estimation model trained using visible distances between the object surface position and arrival points determined based on ray marching for ray directions departing from the object surface position.

12. The electronic device of claim 1, wherein the indirect light estimation model is trained using color information of arrival points of rays departing from the object surface position viewed from the object surface position.

13. The electronic device of claim 12, wherein the color information of the arrival points for training of the indirect light estimation model is estimated using the INR model and a neural renderer which are completely trained.

14. A processor-implemented method, the method comprising:

extracting, using an implicit neural representation (INR) model, a global geometry feature and information indicating whether a point is on a surface of an object from a viewpoint and a view direction corresponding to an image pixel corresponding to a two-dimensional (2D) scene at the viewpoint within a field of view (FOV);

determining an object surface position corresponding to the viewpoint and the view direction and normal information of the object surface position based on the information indicating whether the point is on the surface;

estimating, using an albedo estimation model, albedo information independent of the view direction from the global geometry feature, the object surface position, and the normal information;

estimating, using a specular estimation model, specular information dependent on the view direction from the global geometry feature, the object surface position, the normal information, and the view direction; and estimating, using an indirect light estimation model, indirect light information from the global geometry feature; and determining a pixel value of the image pixel based on scene component information including visibility information, together with the albedo information and the specular information, the visibility information including the indirect light information, wherein the albedo estimation model and the specular estimation model are trained based on an objective function value between a ground truth (GT) 2D image and a temporary 2D image reconstructed using an approximation that is based on a split of a rendering operation for determining a pixel value into a reflection component and an illumination component.

15. The method of claim 14, wherein the determining of the pixel value of the image pixel is performed further based on direct light information together with the albedo information and the specular information.

16. The method of claim 15, wherein the determining of the pixel value comprises individually estimating the visibility information using a visibility estimation model, and the direct light information using a direct light estimation model, from the global geometry feature, the object surface position and the normal information, for ray directions departing from the object surface position.

17. The method of claim 14, further comprising:

adjusting at least one scene component of visibility information, the indirect light information, direct light information, the albedo information, and the specular information, based on a user input; and determining a pixel value of a pixel of a 2D image corresponding to the viewpoint and the view direction based on the adjusted scene component and an estimated scene component.

18. A non-transitory computer-readable storage medium storing instructions that, when executed by one or more processors, configure the one or more processors to perform the method of claim 14.

* * * * *